(12) United States Patent
Tabaaloute et al.

(10) Patent No.: US 10,311,151 B2
(45) Date of Patent: Jun. 4, 2019

(54) OBJECT-LEVEL REPLICATION OF CLONED OBJECTS IN A DATA STORAGE SYSTEM

(71) Applicant: Hitachi Data Systems Engineering UK Limited, Bracknell, Berkshire (GB)

(72) Inventors: Zahra Tabaaloute, Southampton (GB); James Gibbs, Wokingham (GB); Daniel Picken, Ticknall (GB); Jonathan Teh, Basingstoke (GB)

(73) Assignee: Hitachi Vantara Corporation, Santa Clara, CA (US)

( * ) Notice: Subject to any disclaimer, the term of this patent is extended or adjusted under 35 U.S.C. 154(b) by 585 days.

(21) Appl. No.: 14/768,317

(22) PCT Filed: Feb. 21, 2013

(86) PCT No.: PCT/US2013/027113
§ 371 (c)(1),
(2) Date: Aug. 17, 2015

(87) PCT Pub. No.: WO2014/130035
PCT Pub. Date: Aug. 28, 2014

(65) Prior Publication Data
US 2016/0004720 A1   Jan. 7, 2016

(51) Int. Cl.
*G06F 17/30* (2006.01)
*H04L 29/08* (2006.01)
*G06F 11/20* (2006.01)

(52) U.S. Cl.
CPC .. *G06F 17/30088* (2013.01); *G06F 17/30174* (2013.01); *G06F 17/30212* (2013.01);
(Continued)

(58) Field of Classification Search
CPC ......... G06F 17/30088; G06F 17/30212; G06F 17/30575; G06F 17/30581
(Continued)

(56) References Cited

U.S. PATENT DOCUMENTS

| | | | |
|---|---|---|---|
| 8,473,777 B1* | 6/2013 | Rangachari | G06F 3/065 711/112 |
| 2002/0112022 A1* | 8/2002 | Kazar | G06F 17/30106 709/217 |

(Continued)

OTHER PUBLICATIONS

Communication Pursuant to Article 94(3) EPC received in corresponding European Application No. 13 875 395.9 dated Aug. 10, 2018.

(Continued)

*Primary Examiner* — Thu Nguyet T Le
(74) *Attorney, Agent, or Firm* — Mattingly & Malur, PC

(57) ABSTRACT

Object-level replication of cloned objects from a source file system to a target file system in a data storage system maintains relationships between related objects including shared data blocks so that storage requirements in the target file system match storage requirements of the source file system. Specialized processing may be used to scan an indirection object that refers to other file system objects such that objects requiring replication can be identified on an incremental basis based on checkpoint numbers. Checkpoints in the target file system are managed so that checkpoint number requirements for replicated clone objects are enforced in the target file system.

20 Claims, 15 Drawing Sheets

(52) U.S. Cl.
CPC .... *G06F 17/30607* (2013.01); *H04L 67/1095* (2013.01); *G06F 11/2094* (2013.01)

(58) Field of Classification Search
USPC .................. 707/639, 610, 611, 624, 646, 655
See application file for complete search history.

(56) References Cited

U.S. PATENT DOCUMENTS

| | | | |
|---|---|---|---|
| 2005/0246503 A1* | 11/2005 | Fair .................. | G06F 17/30067 711/147 |
| 2012/0130949 A1 | 5/2012 | Picken et al. | |
| 2017/0249329 A1* | 8/2017 | Leverett ............ | G06F 17/30174 |

OTHER PUBLICATIONS

Wendt, J., "the Advantages of Asynchronous Replication", Storage Technology Magazine, Sep. 2007, pp. 1-13, URL: http://searchstorage.techtarget.com/magazineContent/The-advantages-of-asynchronous-replication.

* cited by examiner

OBJECT-LEVEL REPLICATION OF CLONED OBJECTS IN A DATA STORAGE SYSTEM

FIELD OF THE INVENTION

The present invention relates generally to replication of files in a data storage system, and, more particularly, to object-based replication of cloned objects in a data storage system.

BACKGROUND OF THE INVENTION

In a data storage system, some or all objects of a source file system may be replicated to another file system (referred to herein as the "target file system"), for example, to allow for archiving, backup, maintenance, or disaster recovery. Unlike mirroring, where data is stored in two separate locations, replication generally involves the creation of a copy of a source object in the target file system, wherein the target object may be stored in a manner that is quite different from the manner in which the source object is stored. For example, the source object may be stored in non-contiguous blocks while the target object may be stored in contiguous blocks because all blocks for the target object may be allocated at one time whereas the blocks for the source object may have been allocated over an extended period of time and hence may have been allocated from different areas of storage.

Generally speaking, file system replication can be performed at the file level or at the object (sub-file) level. File-level and object-level replication is discussed generally in Hitachi NAS Platform Software: BlueArc® JetMirror datasheet available from Hitachi Data Systems.

Clone files are often handled like any other regular files during an object-based replication and therefore are replicated as a deep copy on the target file system. Such deep copying of the clone files results in creating clone files that do not share any data blocks with their snapshot-files, thus increasing their storage cost on the target file system.

SUMMARY OF EXEMPLARY EMBODIMENTS

In a first embodiment of the invention there is provided a method of replicating a cloned object from a source file system to a target file system in a data storage system. The method involves, when the cloned object is a changed object in the source file system, replicating the cloned object from the source file system to the target file system. Such replicating includes, when the clone object is a newly created clone object, creating the clone object in the target file system based on (a) metadata from the source file system and (b) a parent snapshot-file object associated with the clone object previously replicated from the source file system to the target file system, wherein creating the clone object in the target file system comprises ensuring that a cloned-in-checkpoint number of the clone object in the target file system is higher than checkpoint numbers of the blocks of the parent snapshot-file object; and when there are diverged blocks associated with the clone object in the source file system, replicating the diverged blocks associated with the clone object from the source file system to the target file system.

Creating the clone object in the target file system may involve creating the clone object as a clone of the parent snapshot-file object in the target file system such that the clone object initially shares all its blocks with the parent snapshot-file object.

Ensuring that the cloned-in-checkpoint number of the clone object in the target file system is higher than checkpoint numbers of the blocks of the parent snapshot-file object may involve issuing a checkpoint in the target file system to advance the current checkpoint number of the target file system and setting the cloned-in-checkpoint number of the clone object to the advanced checkpoint number. A checkpoint may be issued, for example, if a last modified checkpoint number of the parent snapshot-file object in the target file system is equal to a current checkpoint number of the target file system in which the clone object was created.

Replicating diverged blocks associated with the clone object may involve detecting blocks of the clone object in the source file system changed since cloning of the cloned object in the source file system, such detecting including comparing a checkpoint number associated with each of a number of blocks with a cloned-in-checkpoint number of the clone object in the source file system; sending, from the source file system to the target file system, blocks having a checkpoint number higher than or equal to the cloned-in-checkpoint number; and updating the clone object in the target file system based on blocks received from the source file system.

Replicating the cloned object from the source file system to the target file system may further involve, when the cloned object is an object previously replicated to the target file system that has gained the properties of a clone since such previous replication and the parent snapshot-file object is not a new object, sending metadata from the source file system to the target file system, recreating the clone object in the target file system as clone that initially shares all its blocks with the parent snapshot-file object based on the metadata from the source file system and the previously replicated snapshot-file object on the target file system (as a result of forming the clone's root onode based on that of its parent when the clone is first created), and when there are diverged blocks associated with the clone object in the source file system, replicating the diverged blocks associated with the clone object from the source file system to the target file system. Determining if the cloned object is an object previously replicated to the target file system that has gained the properties of a clone since such previous replication may be based on a cloned-in-checkpoint number of the clone object in the source file system.

Replicating the cloned object from the source file system to the target file system may further involve, when the cloned object is a clone object previously replicated to the target file system that has a new parent snapshot-file object in the source file system, replicating diverged blocks of the clone object in the source file system relative to the new parent snapshot-file object.

Replicating the cloned object from the source file system to the target file system may further involve, when the cloned object is a regular file object that was a clone object previously replicated to the target file system and decloned since such previous replication, replicating the regular file object from the source file system to the target file system by replicating all of its user/metadata blocks.

The method may further involve replicating the parent snapshot-file object from the source file system to the target file system prior to replicating the clone object. Replicating the clone object may involve adding an initial work item for the replication of the clone object to a chunk queue and executing the initial work item including, if the parent snapshot-file object is an old object, replicating the clone object to the target file system, and if the parent snapshot-file object is a new object, terminating execution of the initial work item without replicating the clone object to the target file system. Replicating the parent snapshot-file object may involve adding a first work item to a clones queue for replication of the parent snapshot-file object, adding a second work item to a pending map for subsequent replication of the clone object, executing the first work item to replicate the parent snapshot-file object, and upon completion of such replication of the parent snapshot-file object, moving the second work item from the pending map to the clones queue. The initial work item may be a CREATE work item. The first work item may be a SPAWN work item or an ACTIVE work item. The second work item may be a SPAWN work item or an ACTIVE work item.

In a second embodiment of the invention there is provided a data storage system for replicating a cloned object from a source file system to a target file system, the system comprising a source having a source file system and a source storage processor and a target having a target file system and a target storage processor. The source storage processor is configured to, when the cloned object is a changed object in the source file system, replicate the cloned object from the source file system to the target file system, such replicating including, when the cloned object is a newly created clone object, sending the necessary metadata for the clone object and its parent snapshot-file object to the target storage processor. The target storage processor is configured to create the clone object in the target file system based on (a) metadata from the source storage processor and (b) a parent snapshot-file object associated with the clone object previously replicated from the source file system to the target file system, wherein the target storage processor ensures that a cloned-in-checkpoint number of the clone object in the target file system is higher than checkpoint numbers of the blocks of the parent snapshot-file object. Furthermore, when there are diverged blocks associated with the clone object in the source file system, the source storage processor and the target storage processor are further configured to replicate the diverged blocks associated with the clone object from the source file system to the target file system.

The target storage processor may be configured to create the clone object as a clone of the parent snapshot-file object in the target file system such that the clone object initially shares all its blocks with the parent snapshot-file object.

The target storage processor may be configured to ensure that the cloned-in-checkpoint number of the clone object in the target file system is higher than checkpoint numbers of the blocks of the parent snapshot-file object by issuing a checkpoint in the target file system to advance the current checkpoint number of the target file system and setting the cloned-in-checkpoint number of the clone object to the advanced checkpoint number. A checkpoint may be issued, for example, if a last modified checkpoint number of the parent snapshot-file object in the target file system is equal to a current checkpoint number of the target file system in which the clone object was created.

Replicating diverged blocks associated with the clone object may involve detecting, by the source storage processor, blocks of the clone object in the source file system changed since cloning of the cloned object in the source file system, such detecting including comparing a checkpoint number associated with each of a number of blocks with a cloned-in-checkpoint number of the clone object in the source file system; sending, by the source storage processor to the target storage processor, blocks having a checkpoint number higher than or equal to the cloned-in-checkpoint number; and updating, by the target storage processor, the clone object in the target file system based on blocks received from the source storage processor.

The source storage processor may be further configured to determine if the cloned object is an object previously replicated to the target file system that has gained the properties of a clone since such previous replication, and when the cloned object is an object previously replicated to the target file system that has gained the properties of a clone since such previous replication and the parent snapshot-file object is not a new object, send the necessary metadata for the clone object and its parent snapshot-file object to the target storage processor. The target storage processor may be further configured to recreate the clone object in the target file system as clone that initially shares all its blocks with the parent snapshot-file object based on the metadata from the source file system and the previously replicated parent snapshot-file object on the target file system. When there are diverged blocks associated with the clone object in the source file system, the source storage processor and the target storage processor may be further configured to replicate the diverged blocks associated with the clone object from the source file system to the target file system. The source storage processor may be configured to determine if the cloned object is an object previously replicated to the target file system that has gained the properties of a clone since such previous replication based on a cloned-in-checkpoint number of the clone object in the source file system.

The source storage processor may be further configured to determine if the cloned object is a clone object previously replicated to the target file system that has a new parent snapshot-file object in the source file system, and when the cloned object is a clone object previously replicated to the target file system that has a new parent snapshot-file object in the source file system, send user/metadata to the target storage processor for replicating diverged blocks of the clone object in the source file system relative to the new parent snapshot-file object. The target storage processor may be further configured to replicate diverged blocks of the clone object in the target file system based on the user/metadata.

The source storage processor may be further configured to determine if the cloned object is a regular file object that was a clone object previously replicated to the target file system and decloned since such previous replication, and when the cloned object is such a regular file object, send all its user/metadata to the target storage processor for replicating the regular file object from the source file system to the target file system. The target storage processor may be further configured to replicate the regular file object by replicating all of its user/metadata blocks based on the user/metadata from the source file system.

The source storage processor may be further configured to cause replication of the parent snapshot-file object from the source file system to the target file system prior to replication of the clone object. In this context, replication of the clone object may involve adding an initial work item for the replication of the clone object to a chunk queue and executing the initial work item including, if the parent snapshot-file object is an old object, replicating the clone object to the target file system, and if the parent snapshot-file object is a new object, terminating execution of the initial work item without replicating the clone object to the target file system. Replication of the parent snapshot-file object may involve adding a first work item to a clones queue for replication of the parent snapshot-file object, adding a second work item to a pending map for subsequent replication of the clone object, executing the first work item to replicate the parent snapshot-file object, and upon completion of such replication of the parent snapshot-file object, moving the second work item from the pending map to the clones queue. The initial work item may be a CREATE work item. The first work item may be a SPAWN work item or an ACTIVE work item. The second work item may be a SPAWN work item or an ACTIVE work item.

Embodiments also may include a source having a source storage processor and a source file system, wherein the source storage processor is configured to perform any of the various source operations as claimed or otherwise described herein.

Embodiments also may include a target having a target storage processor and a target file system, wherein the target storage processor is configured to perform any of the various target operations as claimed or otherwise described herein.

Embodiments also may include one or more computer programs configured to perform any of the various source or target operations as claimed or otherwise described herein. A computer program may be stored in a computer-readable medium, such as a tangible, non-transitory computer-readable medium.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
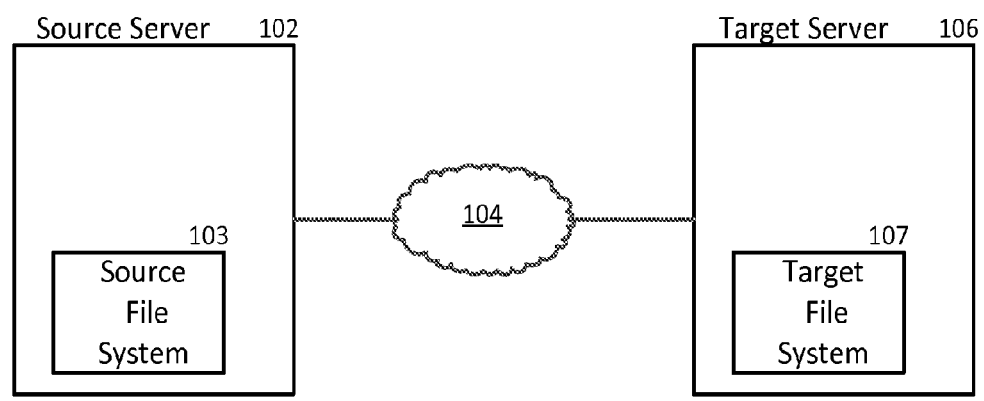
FIG. 1 is a schematic block diagram of a file storage system in accordance with an exemplary embodiment of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more file systems, with each file system having a separate name and identifier and potentially different characteristics (e.g., one file system may be formatted with 32 KB blocks and another with 4 KB blocks, one file system may be Worm and another not, etc.). Each file system on the span is formatted, mounted, and unmounted separately. File systems may be created and deleted in any order and at any time. File systems typically can be configured to expand automatically (or alternatively to prevent or restrict auto-expansion) or can be expanded manually.

A "block" is a unit of storage in the file system that corresponds to portion of physical storage in which user data and/or system data is stored. A file system object (discussed below) generally includes one or more blocks.

A "snapshot-file" or "SF" is a file system object that is created as part of an object cloning process as described in U.S. Patent Application Publication No. US 2012/0130949, which is hereby incorporated herein by reference in its entirety, and as used in certain embodiments of the present invention. A snapshot-file is a data stream snapshot object generated during the cloning process which takes ownership of the shared user/metadata blocks and is referenced by the clones sharing these user/metadata blocks.

A "successor" or "child" of a snapshot-file is either a regular file clone (also referred to as a live-file) or a snapshot-file referencing it.

The "parent" of a clone or snapshot-file is the snapshot-file it references.

A "root snapshot-file" is a snapshot-file without a parent.

A "new snapshot" is the snapshot taken on the source that is being replicated to the target.

A "previous snapshot" is the latest snapshot that has been replicated to the target file system.

A "new object" is an object with a creation checkpoint number greater than the checkpoint number of the previous snapshot.

An "old object" is an object with a creation checkpoint number less than or equal to the checkpoint number of the previous snapshot.

A "modified object" is an object having a last modified checkpoint number (representing the last checkpoint in which the object was created or modified) higher than the checkpoint number of the previous snapshot.

A "deleted object" is an object that existed in the previous snapshot and was deleted in the new snapshot.

In the context of this specification, the term "clone" will refer to an object of type regular file or snapshot-file that references a parent snapshot-file.

With respect to a given replication cycle, a "cloned object" is an object that existed as a clone object in the previous replication cycle (and may have been modified, deleted, decloned, or gained a new parent snapshot-file object since the previous replication cycle) or has become a clone object since the previous replication cycle (e.g., a newly created clone object or a previously replicated object that has gained the properties of a clone).

A "set" of values may include one or more values.

Headings are used below for convenience and are not to be construed as limiting the present invention in any way.

1. Exemplary File Storage System

Exemplary embodiments of the present invention are described with reference to an exemplary file system of the type used in various file servers sold by Hitachi Data Systems and known generally as BlueArc Titan™ and Mercury™ file servers, although it should be noted that various concepts may be applied to other types of file systems.

FIG. 1 is a schematic block diagram of a file storage system in accordance with an exemplary embodiment of the present invention. Among other things, the file storage system includes a source file server 102 (often referred to herein simply as "the source") in communication with a target file server 106 (often referred to herein simply as "the target") over a communication network 104. The source server 102 manages a source file system 103, while the target server 106 manages a target file system 107. Each server is typically in communication with various client devices over a communication network such as an Internet Protocol network (e.g., the Internet) and also in communication with various RAID systems over a storage network such as a FibreChannel network. The client devices and the file servers communicate using one or more network file protocols, such as CIFS and/or NFS. The file servers and the RAID systems communicate using a storage protocol, such as SCSI.

Each file server includes a storage processor for managing its respective file system(s). The file servers can be configured to allow client access to portions of the file systems, such as trees or sub-trees under designated names. In CIFS parlance, such access may be referred to as a "share" while in NFS parlance, such access may be referred to as an "export." Internally, each file server may include various hardware-implemented and/or hardware-accelerated subsystems, for example, as described in U.S. Pat. No. 6,826,615 (2337/103) and U.S. Pat. No. 8,180,897 (2337/108), each of which is hereby incorporated herein by reference in its entirety, and may include a hardware-based file system including a plurality of linked sub-modules, for example, as described in U.S. Pat. No. 7,457,822 (2337/104) and U.S. Pat. No. 8,224,877 (2337/117), each of which is hereby incorporated herein by reference in its entirety.

Each RAID system typically includes at least one RAID controller (and usually two RAID controllers for redundancy) as well as a number of physical storage devices (e.g., disks) that are managed by the RAID controller(s). The RAID system aggregates its storage resources into a number of SDs. For example, each RAID system may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

Each file server is configured to use one or more SDs from its respective RAID system(s). A file server can normally interrogate its RAID systems to find out whether each SD is primary or secondary. The method of controlling which SDs are used by the file server may be referred to as "licensing." Thus, in practice, the file server 102 will typically be licensed for some SDs and unlicensed for others.

Internally, each file server is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Each file server stores various types of objects in the file system. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. A software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

In certain embodiments, an instantiation of the file system is managed using a tree structure having a root node (referred to as a dynamic superblock or DSB). Each file server may maintain multiple DSBs to store different versions of the file system representing different checkpoints (e.g., a current "working" version and one or more "checkpoint" versions). In one exemplary embodiment, the DSB includes a pointer to an indirection object, which in turn includes pointers to other objects. Each object referenced by the indirection object is associated with an object number. System objects typically have fixed, predefined object numbers, since they generally always exist in the system. File objects are typically assigned object numbers dynamically from a pool of available object numbers, and these file object numbers may be reused in some circumstances (e.g., when a file is deleted, its object number may be freed for reuse by a subsequent file object). The indirection object can be indexed by object number in order to obtain a pointer to the corresponding object.

Figure 2:
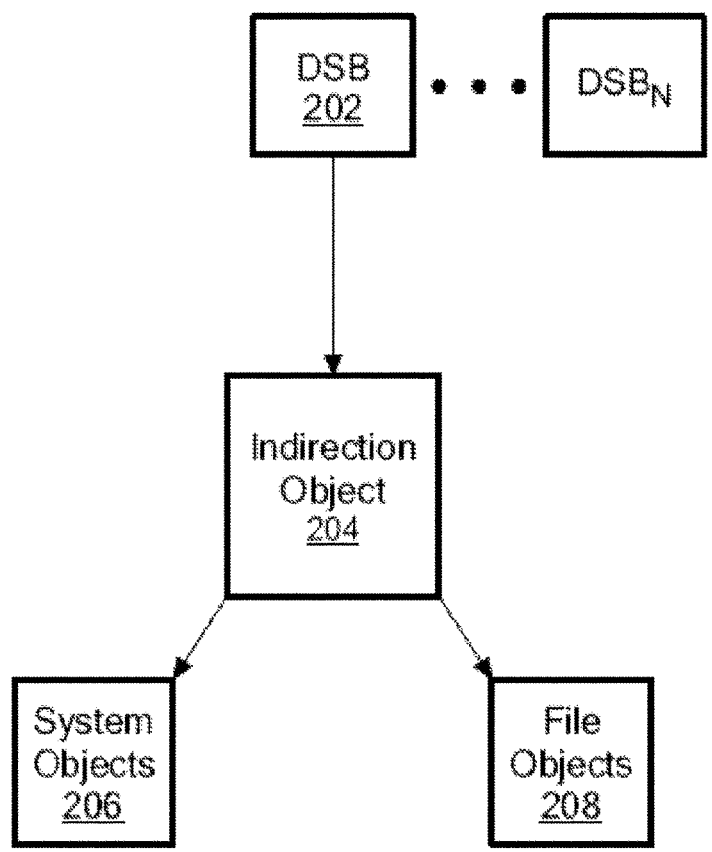
FIG. 2 is a schematic block diagram showing the general format of a file system instantiation in accordance with an exemplary embodiment of the present invention.

FIG. 2 is a schematic block diagram showing the general format of a file system instantiation in accordance with an exemplary embodiment of the present invention. The DSB 202 is a special structure that represents the root of the file system tree structure. Among other things, the DSB 202 includes a pointer to an indirection object 204, which in turn includes pointers to other objects in the file system including system objects 206 and file objects 208.

Generally speaking, each object in the file system, including the indirection object 204, each of the system objects 206, and each of the file objects 208, is implemented using a separate tree structure that includes a separate object root node (sometimes referred to as a root onode) and optionally includes a number of indirect nodes (sometimes referred to as an indirect onode), direct nodes (sometimes referred to as a direct onode), and storage blocks. The DSB 202 includes a pointer to the root node of the indirection object 204. The indirection object includes pointers to the root nodes of the other objects 206, 208.

Figure 3:
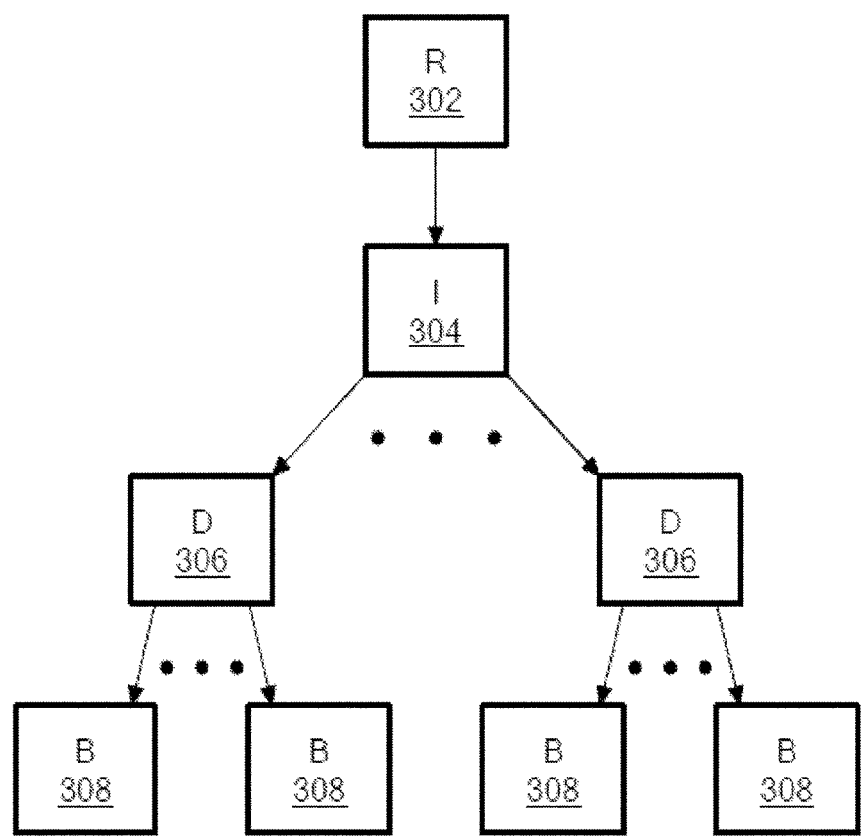
FIG. 3 is a schematic block diagram showing the general format of an object tree structure in accordance with an exemplary embodiment of the present invention.

FIG. 3 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

As data is added to the object, it is first of all put into data blocks pointed to directly from the root node. Once all the direct block pointers in the root node are filled, then a direct node is created with a pointer from the root node to the direct node. If the data in the object grows to fill all the data pointers in the direct node, then an indirect node is created.

Thus, over time, a root node may point to various indirect nodes, each of which may point to a number of direct nodes, each of which may point to a number of storage blocks. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node.

The object root node also includes an area of storage referred to as the "enode" in which various types of object metadata are stored.

For the actual data to which the object root node corresponds, the object root node includes a separate pointer to each block of data associated with the corresponding object.

In general, pointers to up to 16 data blocks are stored in the object root node. For data going beyond 16 blocks, one or more direct nodes and/or indirect nodes are needed in the object tree, with appropriate pointers stored as needed in each node to link the various nodes. Such pointers store the sector number of the on-disk block associated with the corresponding data block or node.

The direct node includes a checkpoint number and is arranged to store the locations of a certain number of blocks (e.g., about 60 or 61 blocks) pertinent to the object.

When a first direct node is fully utilized to identify data blocks, then one or more indirect nodes are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, regardless of the file's fragmentation.

As discussed above, the indirect node provides a level of indirection between the root node and the direct node. The following information is stored in the indirect node in one exemplary embodiment:

The checkpoint number.
Pointers to either indirect or direct nodes (e.g., up to 60 such pointers).
A CRC and various sanity dwords to allow the indirect node to be checked for validity.

As discussed above, the direct node provides direct pointers to data blocks on the disk. The following information is stored in the direct node in one exemplary embodiment:

The checkpoint number.
A number of data block descriptors (e.g., up to 60 such descriptors). Each data block descriptor includes a pointer to a data block, the checkpoint number, and a bit to say whether the block is zero filled.
A CRC and various sanity dwords to allow the indirect node to be checked for validity.

Within each node (i.e., root, indirect, direct), each pointer to a block or other node is associated with a checkpoint number to indicate the checkpoint associated with the block/node referenced by the pointer.

A checkpoint mechanism, for example, as described in U.S. Pat. No. 7,457,822 (2337/104), which was incorporated by reference above, and in U.S. Pat. No. 8,041,735 (2337/105), which is hereby incorporated herein by reference in its entirety, is included to make temporary copies and optional retained copies of the file system at various times. Specifically, the processing of file system requests is delineated by a series of checkpoints that are scheduled to occur no less frequently than some user-specified interval, such as every 10 seconds. With respect to each successive checkpoint, there is stored, on disk, current file structure information that supersedes previously stored file structure information from the immediately preceding checkpoint. Checkpoints are numbered sequentially and are used to temporally group processing of file requests. Each file system object is associated with the checkpoint in which it is created, and the creation checkpoint number is stored in the object root node.

For a variety of purposes, it may be useful to have knowledge of the file system structure at a selected point in time. This capability is provided by permitting storage of file system structure data associated with the currently saved checkpoint, which is referred to hereinafter for convenience as a retained checkpoint or snapshot. The retained checkpoint is essentially a read-only version of the file system structure at a particular checkpoint. Multiple retained checkpoints can be taken, and mechanisms are included for deleting a selected retained checkpoint or reverting the file system to a selected retained checkpoint (for example, to return the file system to a known state following a catastrophe).

In certain embodiments of the present invention, a file cloning mechanism, for example, as described in U.S. Patent Application Publication No. US 2012/0130949 (2337/130), which is hereby incorporated herein by reference in its entirety, is included to allow for quickly creating copies (clones) of files within a file system, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source data stream and the clone initially share such elements and continue to share unmodified elements as changes are made to the source data stream or mutable clone. None of the user data blocks or the metadata blocks describing the data stream (i.e., the indirect/direct onodes) associated with the source data stream need to be copied at the time the clone is created. At appropriate times, cloned files may be "de-cloned."

In exemplary embodiments, a file system object is cloned by first creating a new object that represents a read-only clone (snapshot) of the source object, referred to hereinafter as a "data-stream-snapshot" ("DSS") or "snapshot-file" ("SF") object and then creating a mutable clone of the object. The block pointers and onode block pointer in the root onode of the clone objects are initially set to point to the same blocks as the source object. Certain metadata from the source object (e.g., file times, security, etc.) and named data streams are not copied to the clone object. Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the file system users. Both the source object and the mutable clone object effectively become writable versions of the DSS object and effectively store their divergences from the DSS object.

Figure 4:
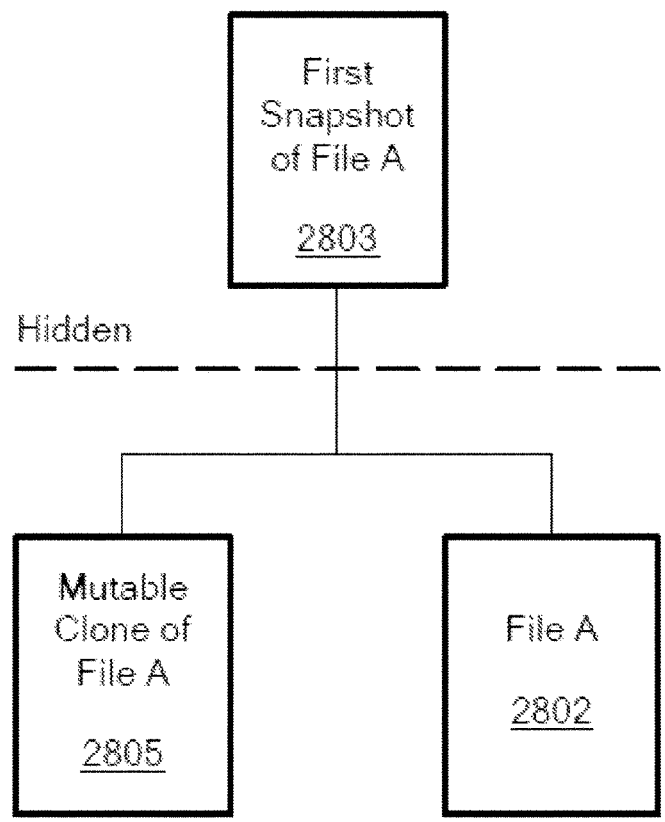
FIG. 4 schematically shows the relationship between a source object (FileA), a hidden data-stream-snapshot object, and a mutable clone, in accordance with an exemplary embodiment of the present invention.

FIG. 4 schematically shows the relationship between the source object (FileA) 2802, the hidden data-stream-snapshot object 2803, and the mutable clone 2805, in accordance with an exemplary embodiment of the present invention.

2. Object-Level Replication Overview

As discussed above, in a data storage system, some or all objects of a source file system may be replicated to a target file system, for example, to allow for archiving, backup, maintenance, or disaster recovery. The target file system may be in the same file server as the source file system or may be in a separate file server than the source file system, as shown in FIG. 1.

Generally speaking, object-level replication involves creating, in the target file system, object structures that correspond to object structures in the source file system. For example, in order to replicate an entire source object in the target file system, the target generally builds an entire tree structure for the object including allocation of blocks of storage for the object data and metadata and creation of the various object onode structures including the root onode and any other nodes/blocks, based on information about the source object provided by the source. It should be noted, however, that the actual layout of objects in the target file system may be (and generally is) different than the layout of the corresponding objects in the source file system because, among other things, replication generally involves the target managing checkpoints in the target file system independently of checkpoints in the source file system (e.g., the source file system may be at checkpoint number 100 while the target file system is at checkpoint number 200) and allocating blocks for onodes and data independently of the source file system (e.g., while the data blocks for a source object may have been allocated at different times and hence may have been allocated from non-contiguous storage, the data blocks for the target object may be allocated from contiguous storage when the object is first created in the target file system since the data blocks for the object generally are being allocated at substantially the same time). Thus, replication is quite different from merely copying blocks of data from the source file system to the target file system (e.g., such as in mirroring).

In an exemplary embodiment, replication generally is performed in cycles, where a replication cycle involves taking a new snapshot, scanning the indirection object in the new snapshot to identify any object that have changed since the previous snapshot associated with the last replication cycle (where changed objects include new objects created since the previous snapshot, existing objects that have been modified since the previous snapshot, and objects that have been deleted since the previous snapshot), and replicating the changed objects to the target file system. In an exemplary embodiment, new and modified objects are identified based on checkpoint numbers (specifically, a new object is one having a creation checkpoint number greater than the checkpoint number of the previous snapshot, while a modified object is one having a creation checkpoint number less than or equal to the checkpoint number of the previous snapshot and a last modified checkpoint number greater than the checkpoint number of the previous snapshot), while a deleted object is identified by the object's type (i.e., deleted objects have specific object type designations). After the replication cycle, the new snapshot becomes the previous snapshot for the next replication cycle. Thus, each replication cycle effectively performs an incremental replication of only changed objects. It should be noted that, although replication generally is performed in cycles, an exemplary embodiment also permits full replication of the entire source file system, e.g., as the initial replication to the target file system. It also should be noted that mechanisms for replication of objects described herein may be used in alternative embodiments for full or incremental replication on an object basis rather than on a file system basis, e.g., a selected object may be replicated to the target file system without the remainder of the source file system being replicated.

In certain exemplary embodiments, the indirection object is scanned in chunks by a number of indirection object scanner fibers (which may be referred to herein collectively as the "indirection object scanner") as discussed more fully below, although in alternative embodiments, the indirection object may be processed by a single scanner. Specifically, a number of indirection object scanner fibers are spawned, and each indirection object scanner fiber scans a designated portion of the indirection object (e.g., a designated range of object numbers) to identify any modified or deleted objects in its respective chunk. When an indirection object scanner fiber identifies a changed object in its respective chunk, it creates a work item as discussed more fully below in a corresponding Chunk Queue (where an exemplary embodiment maintains one Chunk Queue per indirection object chunk). For convenience, a work item for a new object is referred to as a CREATE work item, a work item for a modified object is referred to as a MODIFY work item, and a work item for a deleted object is referred to as a DELETE work item. A number of reader fibers take work items off of the Chunk Queues and processes the work items, as discussed more fully below. Among other things, the use of multiple fibers to scan the indirection object and process the work items allows such scanning and processing to be performed in parallel.

Figure 5:
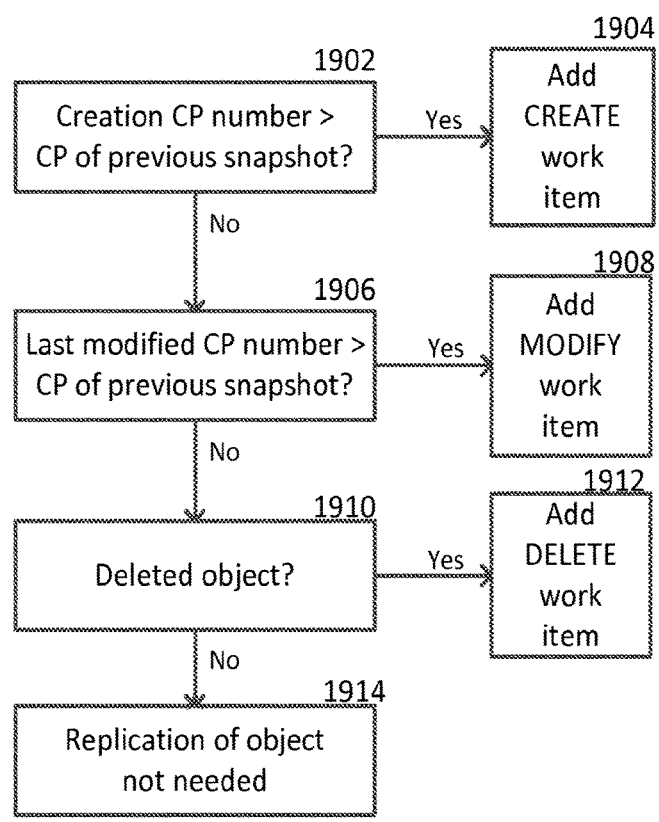
FIG. 5 is a logic flow diagram for generating work items for the Chunk Queues, in accordance with an exemplary embodiment.

FIG. 5 is a logic flow diagram for generating work items for the Chunk Queues, in accordance with an exemplary embodiment. The source examines each object in the indirection object. If the creation checkpoint number of an object is greater than the checkpoint number of the previous snapshot (YES in block 1902), then the object was newly created, and the source adds a CREATE work item to the appropriate Chunk Queue, in block 1904. Otherwise (NO in block 1902), if the last modified checkpoint number of the object is greater than the checkpoint number of the previous snapshot (YES in block 1906), then the object is an existing object that was replicated to the target file system but has been modified since, and the source adds a MODIFY work item to the appropriate Chunk Queue, in block 1908. Otherwise (NO in block 1906), if the object was deleted since the previous snapshot (YES in block 1910), then the source adds a DELETE work item to the appropriate Chunk Queue, in block 1912. Otherwise (NO in block 1910), replication of the object is not needed in this replication cycle, in block 1914.

3. Object-Level Replication of Cloned Objects

Replication of cloned objects is often handled by creating so-called "deep" copies of the cloned objects, i.e., while the cloned objects in the source file system often share various data and metadata blocks, the cloned objects are created in the target file system without such shared data and metadata blocks such that the cloned source objects are essentially de-cloned in the target file system. For example, two objects that share a particular block in the source file system will not share that block in the target file system; instead, a separate block will be allocated for each of the objects. One disadvantage of using deep copies to replicate cloned objects it that the free space required to replicate the clones on the target file system will be greater than the space they occupy on the source file system. Thus, while such "deep" replication of cloned objects is relatively simple from an implementation standpoint, some of the advantages of having cloned files (e.g., reduced storage space) are lost in the target file system when such "deep" replication is performed.

In exemplary embodiments of the present invention, however, replication of cloned objects is performed in such a way that the sharing of data and metadata blocks can be maintained for cloned objects created in the target file system. Because of the way snapshot-file objects (SFs) are used during the cloning process in certain exemplary embodiments as described in U.S. Patent Application Publication No. US 2012/0130949, objects associated with a snapshot-file tree generally must be replicated in a particular order, specifically ensuring that a parent snapshot-file object is replicated before any of its children are replicated. Thus, when an entire snapshot-file tree is being replicated, replication generally begins with the root snapshot-file and then replication processes the remainder of the snapshot-file tree in a recursive fashion.

3.1. Summary of Clone Replication Features

Object-level clone replication schemes described herein include some or all of the following features:

Clones maintain their object properties over object replication by emulating the cloning mechanisms used on a live file system to create the clone objects on the target file system.

Replicated clones use the same amount of space on the target. The user/metadata blocks shared between clones on the source file system are also shared on the target file system.

The data transferred between the source and the target when replicating clones is minimized. The shared user/metadata blocks between multiple clones are transferred and written once on the target file system. Only diverged data is transferred and written for each clone object.

The processing resources used to replicate clone objects and other types of objects are shared seamlessly.

The method allows reusing all the existing mechanisms used by object replication to replicate other types of objects.

A file system containing clones is replicated in a single pass replication, i.e., one indirection object scan is sufficient for the detection of all changed objects and their replication.

Only the changed branches of a given snapshot-file tree are processed and replicated. The unchanged branches are not processed.

New clone objects (i.e., a changed object with a creation checkpoint greater than the checkpoint number of the previous snapshot) are replicated starting from the roots of the new trees or branches.

The roots of the new trees or branches are easily identified when processing changed objects by examining the creation checkpoint of the parent of new snapshot-files. For a replication session with N new snapshot-file object, the overhead this incurs is N access to enode metadata and N access to root onodes.

Replication of new clone trees or branches by combining a parallelized level-order walk of the tree with a depth-first preorder walk of the tree depending on resource availability.

There is no limitation on the number of clones processed during a replication, the size of their trees, or the number of clones referencing the same snapshot-file.

The overhead incurred by the replication of a new clone on the target, compared to other types of objects, is a read access to the snapshot-file's root onode, issuing checkpoint if needed, and a write access to the clone's root onode.

No overhead is incurred by the replication of a modified clone on the target compared to other types of objects (a modified object is a changed object with a creation checkpoint less than or equal to the checkpoint of the previous snapshot). Special cases where the clone was the source data stream, the parent snapshot-file has changed, or the clone was decloned may incur the transfer and writing of some additional data on the target file system. Such cases can be optimized further, although the additional processing may outweigh the benefits.

No overhead is incurred by the replication of a deleted clone on the target compared to other types of objects (a deleted object is a changed object that exists in the previous snapshot but not in the current snapshot).

Changes to a clone object are replicated in parallel using multiple fibers on both the source and target.

Modified clones, new branches or the same snapshot-file, and new independent trees are replicated in parallel using multiple fibers on both the source and target.

The number of clones processed in parallel is only limited by the overall resources allocated for the replication.

3.2. Clone Replication

The following is a description of clone replication concepts in accordance with an exemplary embodiment, including discussions of specific special cases of clone replication.

3.2.1. Replication of Deleted Clone Objects

When the source detects that an object has been deleted from the source file system, the source instructs the target to delete the corresponding object from the target file system, and the target deletes the object. In certain situations, even though the object has been deleted from the target file system, certain blocks of the deleted object need to be retained such as for deletion or replication of any clones of the deleted object. In exemplary embodiments, the blocks of the deleted object are automatically retained as part of the snapshot mechanism used during replication and therefore such blocks will remain available until they are no longer being used by any object.

3.2.2. Replication of Newly Created Clone Objects

In the source file system, creating a clone involves creating its snapshot-file first, which is a read-only snapshot of the source data stream. During this process, the source data stream becomes a clone of the snapshot-file. A mutable clone of the snapshot-file is then created. Each clone has a cloned-in-checkpoint number, which refers to the checkpoint number where it was associated with its snapshot-file. The clone initially shares all of its data blocks, and the onode tree's metadata blocks describing the data blocks, with its snapshot-file. When a clone's user/metadata block is modified for the first time, it gets written to new space and becomes a diverged block.

During replication, the source uses the cloned-in-checkpoint number to determine if a modified user block being replicated has diverged from the parent snapshot-file by comparing it to the block pointer checkpoint number; if the block pointer checkpoint number is greater than or equal to the cloned-in-checkpoint number, the user/metadata block is diverged and needs to be written to new space on the target file system.

In this exemplary embodiment, it is necessary to ensure that a new snapshot-file object is fully replicated (created and written) on the target file system before its clone is replicated (created and its diverged blocks written) on the target file system. This is to preserve the relationship between a clone's cloned-in-checkpoint number and user/metadata blocks checkpoint number, and therefore to preserve the clone's divergence over replication. This is not limited to regular file clones; it also applies to snapshot-file clones.

In the case, for example, of a clone CL' of a diverged clone CL, where SF' and SF are their respective snapshot-files, SF' shares some of its data blocks with its parent SF. The relevant branch of the snapshot-file tree in this case looks like:

SF=>CL

=>SF'=>CL'

If SF' and CL' were to be replicated before SF and then SF' is truncated to share its undiverged data blocks with its predecessor SF, these shared blocks would have a checkpoint number greater than the cloned-in-checkpoint number and therefore would be considered as diverged blocks for CL' while not the case. In order to avoid replicating shared data blocks between related snapshot-files twice and to preserve the integrity of all elements in a snapshot-file tree, a snapshot-file is replicated on the target file system before any successor of any level is created on the target file system.

Figure 6:
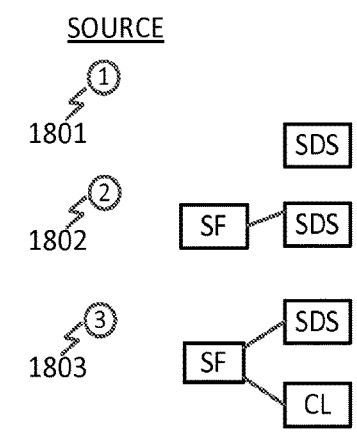
FIG. 6 is a schematic diagram depicting the order of creation of a snapshot-file tree is the target file system compared to the order of creation of the snapshot-file tree in the source file system, in accordance with an exemplary embodiment.
Figure 6:
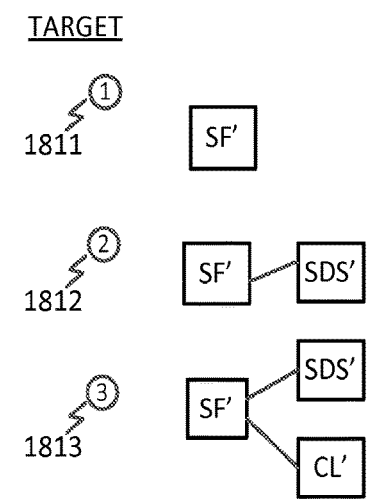

Thus, as depicted schematically in FIG. 6, while a snapshot-file tree in the source file system begins with a source data stream (SDS in step 1801) followed by creation of the snapshot-file object (SF, which effectively becomes a clone of SF, in step 1802) followed by creation of the mutable clone (CL in step 1803), replication of the snapshot-file tree in the target file system begins with creation of the snapshot-file object (SF' in step 1812) followed by creation of the source data stream (SDS' in step 1812) and creation of the mutable clone (CL' in step 1813); creation of the clones SDS' and CL' may be performed in either order.

When creating a new clone object other than a root snapshot-file object in the target file system (i.e., a clone object that at least initially shared blocks with a parent snapshot-file), the new clone object is initially made to be a clone of its parent snapshot-file object. The new clone object is then diverged as necessary, specifically by unlinking any blocks that are no longer shared with the parent snapshot-file object and adding any new blocks that have diverged from the parent snapshot-file object. Importantly, when creating the new clone object, the target needs to ensure that the cloned-in-checkpoint of the new clone object is higher than the checkpoint number of all blocks in the parent snapshot-file object; otherwise, blocks shared by the clone and the snapshot-file object will appear to be diverged even though they are not. Thus, in one exemplary embodiment, when creating the clone object, the target compares the last modified checkpoint of the parent snapshot-file object with the current checkpoint number in the target file system, and if these checkpoint numbers are equal, the target issues a checkpoint in order to advance the checkpoint number of the target file system and sets the cloned-in-checkpoint number of the clone object to the advanced checkpoint number to ensure that the cloned-in-checkpoint number of the clone object is higher than the checkpoint of all blocks in the parent snapshot-file object (otherwise the target can simply set the cloned-in-checkpoint number to the current checkpoint number without issuing a checkpoint).

For example, using the above example, when creating a child of SF' in the target file system (e.g., SDS' or CL'), the child object is initially made to be a clone of SF', i.e., the child object initially shares all of the blocks of SF'. The child object is then diverged as necessary, specifically by unlinking any blocks that are no longer being shared with SF' and adding any new blocks that have diverged from SF' (sent to the target by the source). When creating the child object, the target compares the last modified checkpoint of SF' with the current checkpoint number in the target file system, and if these checkpoint numbers are equal, the target issues a checkpoint in order to advance the checkpoint number of the target file system. The child object is assigned the advanced checkpoint number as its cloned-in-checkpoint number, which ensures that the cloned-in-checkpoint number of the child object is higher than the checkpoint of all blocks in SF'.

Thus, in an exemplary embodiment, the following steps are used to replicate a new clone object on the target file system:

Create a new object using the enode information sent from the source. The created object references the parent snapshot-file, given that object numbers are preserved over object replication.

Form a root onode from the parent snapshot-file's root onode (which, by definition, already would have been replicated to the target file system in either the current replication cycle or a previous replication cycle because the parent snapshot-file object is created in the target file system before any of that snapshot-file object's children are created in the target file system).

Issue a checkpoint if the last modified checkpoint number of the parent snapshot-file is equal to the current checkpoint number of the target file system to advance the checkpoint number (the cloned-in-checkpoint number is a checkpoint number used to distinguish between diverged and undiverged user/metadata blocks; user/metadata blocks with a checkpoint number greater than or equal to the cloned-in-checkpoint number are diverged).

Set the cloned-in-checkpoint number in the root onode to the current (advanced) checkpoint number.

Write the object's root onode to storage. The object now points to the same block pointers as the snapshot-file.

Write the diverged user/metadata blocks received from the source to new space. The source selectively reads and transfers the clone's diverged user/metadata blocks; that is, any block with a checkpoint number greater than or equal to the cloned-in-checkpoint number of the object in the source file system.

A clone object can be either a regular file clone (i.e., a modifiable live copy) or a snapshot-file clone (i.e., a read only snapshot which is generated when cloning a diverged clone). In an exemplary embodiment, clones can be identified by examining a flag in the object's enode.

Creation of root snapshot-file objects (i.e., a snapshot-file generated when cloning a source data stream or an undiverged clone which doesn't have a parent snapshot-file) do not require the special handling described above; they are created on the target file system from scratch because the source data stream object from which to create the root snapshot-file object is not necessarily known in the target file system, and if known, may have moved from its state when it was cloned.

Figure 7:
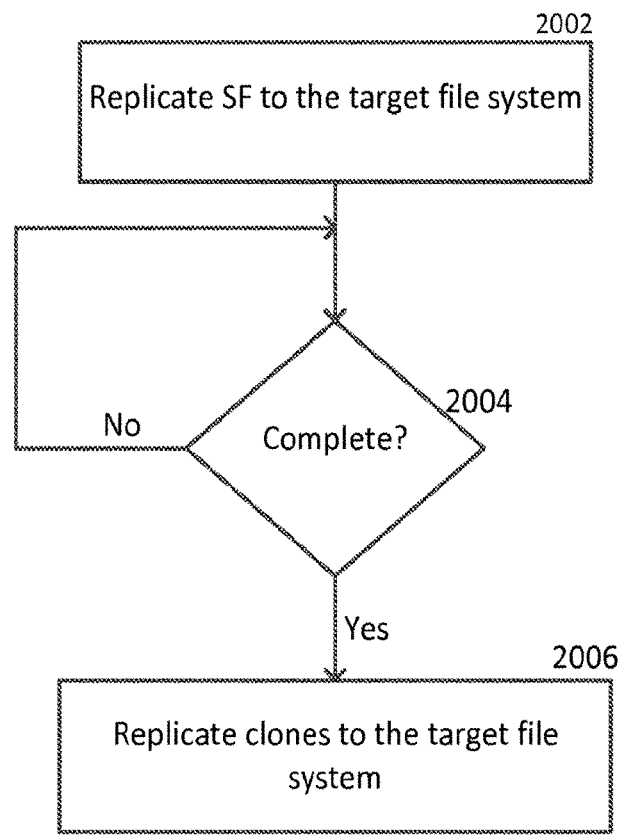
FIG. 7 is a logic flow diagram schematically showing replication of the snapshot-file tree rooted by SF in FIG. 6 to the target file system, in accordance with an exemplary embodiment.

FIG. 7 is a logic flow diagram schematically showing replication of the snapshot-file tree rooted by SF in FIG. 6 to the target file system, in accordance with an exemplary embodiment. In block 2002, the snapshot-file object is replicated to the target file system. Upon completion of such replication of the snapshot-file object (YES in block 2004), clone(s) of the snapshot-file object are replicated to the target file system, in block 2006.

Figure 8:
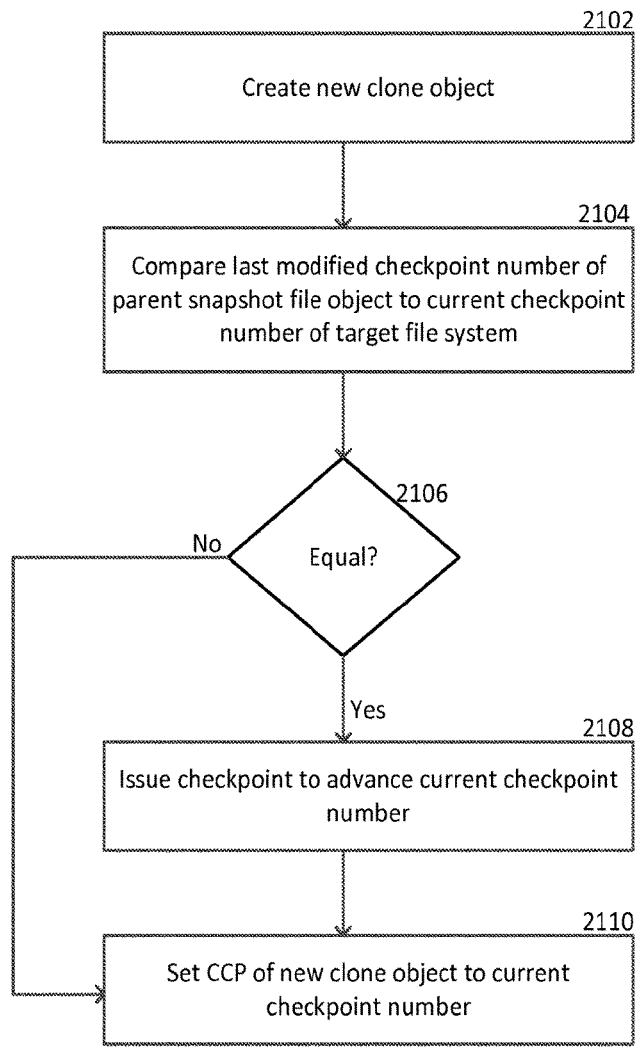
FIG. 8 is a logic flow diagram schematically showing creation of a new clone object by the target, in accordance with an exemplary embodiment.

FIG. 8 is a logic flow diagram schematically showing creation of a new clone object by the target, in accordance with an exemplary embodiment. In block 2102, the target creates the new clone object in the target file system. In block 2104, the target compares the last modified checkpoint number of the clone object's parent snapshot-file object to the current checkpoint number of the target file system. If the checkpoint numbers are equal (YES in block 2106), then the target issues a checkpoint in the target file system to advance the current checkpoint number in the target file system, in block 2108. In block 2110, the target sets the cloned-in-checkpoint number of the clone object to the current checkpoint number, which will be the original current checkpoint number if arrived at block 2110 from NO in block 2106 or will be the advanced checkpoint number if arrived at block 2110 from block 2108. The clone object is initially created as a clone of the parent snapshot-file objects, sharing all blocks with the parent, and then is diverged as necessary as directed by the source.

3.2.3. Object Becomes a Clone Since Previous Snapshot

A regular object that has been replicated to the target file system may gain the property of a clone since the previous snapshot. This can happen, for example, if the object is cloned since the previous snapshot or was in the process of being cloned when the last replication cycle occurred (in an exemplary embodiment, during creation of a clone object in the source file system, the object essentially is created as a regular object and then converted to a clone object that shares all of the user/metadata blocks of its parent snapshot-file, so it is possible for a replication cycle to occur after the object is created but before it has been completely converted into a clone such that the object would be replicated to the target file system as a regular object and then would be identified in the new replication cycle as a modified object that needs to be replicated to the target file system. The object may have diverged from its parent snapshot-file after gaining the property of a clone but before the new replication cycle.

The source can identify an object that has gained the properties of a clone since the previous snapshot (e.g., based on the cloned-in-checkpoint of the object being greater than or equal to the checkpoint number of the previous snapshot) and can determine that the object was in the process of being cloned when the last replication cycle occurred (e.g., if the object's parent snapshot-file is not a new object in the new replication cycle) and, in an exemplary embodiment, the source replicates the object by having the target recreate the object in the target file system as a clone that shares blocks with the parent snapshot-file object (which already has been replicated to the target file system), scanning the object to identify any diverged blocks (i.e., blocks having a checkpoint number greater than or equal to the cloned-in-checkpoint number of the object), and causing replication of the diverged blocks in the target file system. In an exemplary embodiment, recreating the object in the target file system involves deleting the existing object from the target file system and creating the object anew.

If, on the other hand, the object has gained the properties of a clone since the previous snapshot but the parent snapshot-file is new (indicating that the object was cloned since the last replication cycle), then the object will be replicated during replication of the parent snapshot-file object as discussed more fully below.

3.2.4. Simplification of Snapshot-File Tree

When a snapshot-file object has only one child clone, that snapshot-file may be deleted and the clone modified to depend from the parent of the snapshot-file being deleted so as to simplify the snapshot-file tree. For example, in the following, intermediate snapshot-file object SF1 has been deleted since the previous snapshot:

SF0<---SF1<---Clone has changed to SF0<---Clone

The source can identify that such simplification has occurred since the previous snapshot based on the clone object's parent having changed since the previous snapshot. In an exemplary embodiment, the source instructs the target to delete SF1 when processing its DELETE work item and instructs the target to replicate diverged blocks of the clone object relative to SF0 (the object's metadata has changed, since the object now has a new parent object number) when processing the clone's MODIFY work item. Such replication of the clone object requires that any blocks that were shared with SF1 be available so that the target can traverse the onode structures of the clone object as part of the replication process. As discussed above, such shared blocks are automatically retained by the target as part of the snapshot mechanism so that, even if SF1 is deleted before the clone object is replicated, the shared blocks will still be available.

3.2.5. Clone Object has been Decloned

A clone may be decloned, which involves decoupling the object from its parent snapshot-file object and adding blocks to the object corresponding to blocks that previously were shared with the parent snapshot-file object. The source can identify that such decloning has occurred since the previous snapshot based on the object having been a clone in the previous snapshot but not being a clone in the new snapshot. In an exemplary embodiment, the source replicates the object by "deep copying" the object to the target file system.

3.3. Work Items and Reader Fibers

As mentioned above, in certain embodiments, the indirection object is scanned in chunks during an object-based replication to detect objects that have changed since the previous snapshot. Generally speaking, when a changed object is detected, a work item containing the object number, checkpoint number, volume number, and object type is added to the corresponding Chunk Queue for the chunk. Specifically, a CREATE work item is added for a new object, a MODIFY work item is added for a modified object, and a DELETE work item is added for a deleted object. A number of reader fibers take work items off of the Chunk Queues and processes the work items, as discussed more fully below.

In certain exemplary embodiments, processing of the CREATE and MODIFY work items may generate additional work items that are managed using two queues referred to herein as the "pending map" and the "clones queue." Work items placed in the pending map are essentially placeholders that must be moved (promoted) to the clones queue in order to be executed. Work items placed in the clones queue are executed by a pool of process fibers (threads). The work items placed in the clones queue can be executed in any order, and therefore the pending map is used to "stage" how and when work items are promoted to the clones queue to be executed. When a particular work item is executed, the source interacts with the target to cause replication of the corresponding file system object in the target file system; this involves, among other things, the source passing object data and/or metadata to the target and the target creating or updating the object, as described more fully below. In certain exemplary embodiments, the pending map and the clones queue are logical queues that are part of a single physical fixed-length queue.

Figure 9:
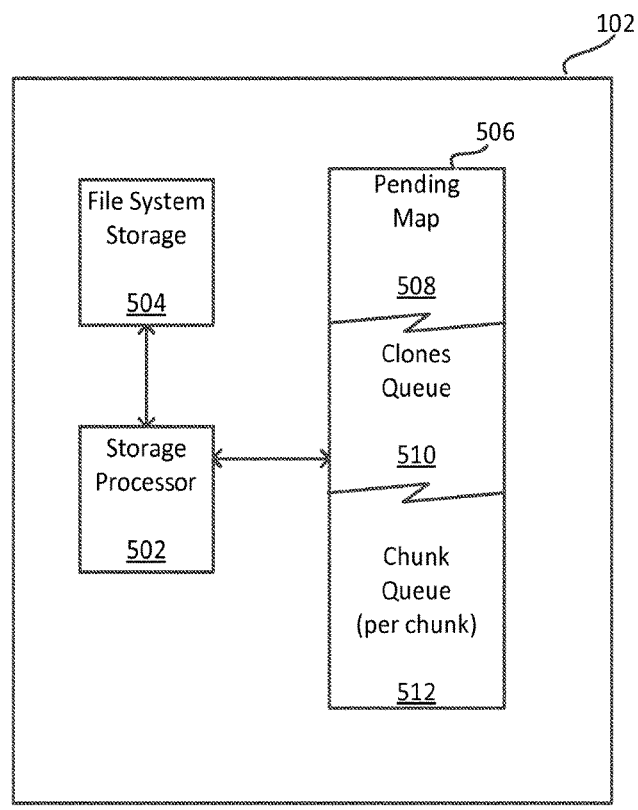
FIG. 9 is a schematic block diagram showing relevant components of a file server in accordance with an exemplary embodiment of the present invention.

FIG. 9 is a schematic block diagram showing relevant components of a file server 102 in accordance with an exemplary embodiment of the present invention. Among other things, the file server 102 includes a storage processor 502, file system storage 504, a global logical queue 506 that is created and maintained on-demand and contains various sub-queues including the pending map 508, the clones queue 510, and a number of Chunk Queues 512 (typically one queue per indirection object chunk) for implementing the chunk-based indirection object scanning as mentioned immediately above. For the sake of convenience and simplicity, details of the storage processor 502 are omitted, although the storage processor 502 generally manages one or more file systems in the file system storage 504 and generally includes substantial hardware and software resources as discussed above.

Figure 10:
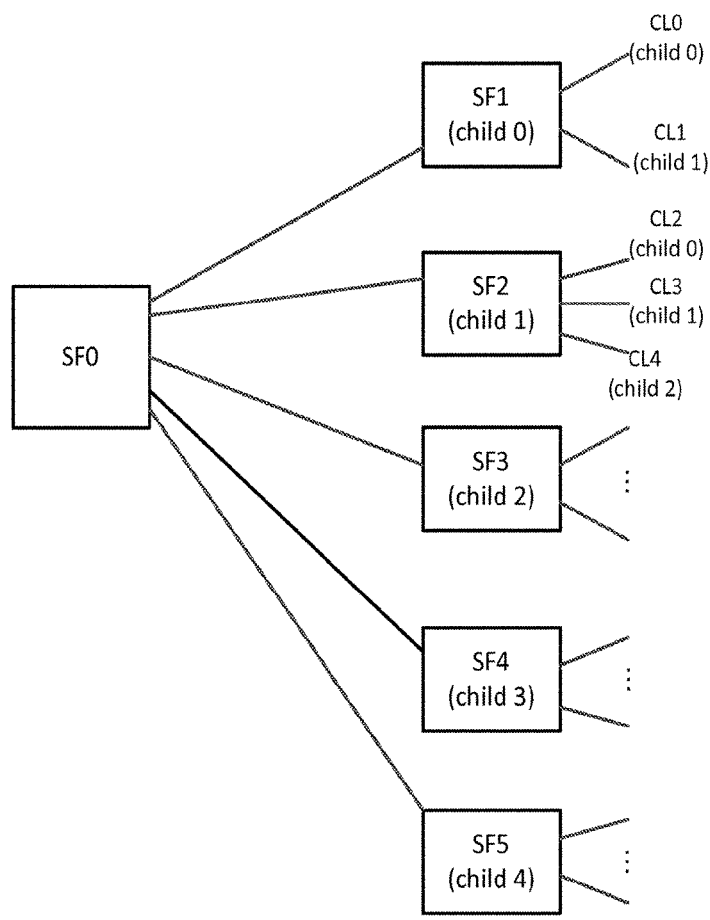
FIG. 10 shows a representation of an exemplary snapshot-file tree.

Some of the basic operations of an exemplary clone replication scheme can be demonstrated by walking through replication of the exemplary snapshot-file tree shown in FIG. 10. In this example, a work item referred to as SPAWN is used, where the SPAWN work item identifies a snapshot-file object and a child number (numbered from zero) representing the next child of the snapshot-file object to be processed (where child number zero is the first child, child number one is the second child, and so forth). SPAWN work items are used to "walk" a snapshot-file tree or portion of a snapshot-file tree to ensure that a parent snapshot-file object is created in the target file system before any of that snapshot-file object's children are created in the target file system.

With reference to FIG. 10, assuming that SF0 is a newly created snapshot-file tree (discussed more fully below), a SPAWN[SF0,0] work item is placed in the pending map, and the SF0 object is replicated. The SPAWN[SF0,0] work item indicates that the children of SF0 need to be replicated starting with child 0 (i.e., SF1) after replication of SF0 is complete.

When notification is received that replication of SF0 is complete, then the SPAWN[SF0,0] work item is promoted to the clones queue, where it is eventually executed by a fiber. This fiber will perform replication of child 0 of SF0 (i.e., SF1) as indicated in the work item but also spawns additional work items as needed to allow the remainder of the tree to be replicated.

Here, the fiber recognizes that SF0 has additional children and therefore adds a SPAWN[SF0,1] work item to the clones queue to indicate that the children of SF0 starting with child 1 (i.e., SF2) still need to be replicated. Since SF0 has already been replicated, replication of SF0's children can happen at any time and therefore the work items for such children can be placed on the clones queue rather than the pending map.

The fiber also recognizes that SF1 has children that need to be replicated, but because SF1 has not yet been replicated, the fiber adds a SPAWN[SF1,0] work item to the pending map rather than to the clones queue to indicate that the children of SF1 need to be replicated starting with child 0 (i.e., CL0) but only after replication of SF1 is complete.

As mentioned above, any work items in the clones queue can be executed at any time, and therefore the SPAWN[SF0, 1] work item may be executed by a fiber to replicate child 1 of SF0 (i.e., SF2), add a SPAWN[SF0,2] work item to the clones queue, and add a SPAWN[SF2,0] work item to the pending map. Each successive SPAWN[SF0,n] work item may be executed, causing replication of the specific child of SF0 as well as creation of additional work items as needed. The fiber that executes SPAWN[SF0,4] to replicate SF5 will not generate a SPAWN[SF0,5] work item since SF5 is the last child of SF0, although that fiber may add a SPAWN [SF5,0] work item on the pending map if SF5 has any children.

With reference again to replication of SF1, when notification is received that replication of SF1 is complete, then the SPAWN[SF1,0] work item is promoted from the pending map to the clones queue, and the recursive process continues from that work item, i.e., a fiber picks up the SPAWN[SF1,0] item, adds a SPAWN[SF1,1] work item to the clones queue, and begins replication of child 0 of SF1 (i.e., CL0). Another fiber picks up SPAWN[SF1,1] and begins replication of child 1 of SF1 (i.e., CL1), but since there are no other children of SF1, no additional work item is generated.

Similar processing is performed on the SPAWN[SF2,n], SPAWN[SF3,n], SPAWN[SF4,n], or SPAWN[SF5,n] work items and any other work items (e.g., for example, if SF3, SF4, or SF5 has one or more child snapshot-file objects).

As mentioned above, in certain exemplary embodiments, the pending map and the clones queue are logical queues that are part of a single physical fixed-length queue. As can be seen from the above-example, when a particular work item is executed from the clones queue, zero, one or two additional work items may be generated from that work item. During the replication process, it is possible for the logical queue to become full so that a given work item cannot be replaced with two work items (a completed work item can always be replaced with a single work item).

Thus, in certain exemplary embodiments, a second type of work item referred to as ACTIVE may be used in some circumstances. The ACTIVE work item essentially takes the place of two SPAWN work items and forces a more sequenced processing of the snapshot-file tree by effectively indicating (1) what operation needs to be done next and (2) where to return after the operation is complete.

Using the example described above with reference to FIG. 10, say that when the SPAWN[SF0,0] work items is processed, the queue is full. Rather than adding a SPAWN[SF0, 1] work item to the clones queue and adding a SPAWN[SF1, 0] work item to the pending map, the fiber may replace both work items with an ACTIVE[SF0,0,SF1,0] work item added to the pending map that instructs the system to replicate SF1 and its children and return to SF0 child 1 (i.e., [SF0,(0+1)]).

When queue entries start to free up, the system can revert from using ACTIVE entries to using SPAWN entries so that parallel replication processing can continue.

The following example illustrates the replication of a snapshot-file tree SF0 using both SPAWN and ACTIVE work entries:

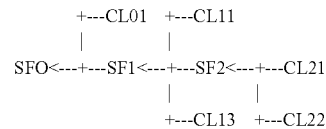

A worker fiber pulls a CREATE(SF0) work item from a chunk queue. It adds a SPAWN (SF0,0) work item to the pending map and replicates SF0. When SF0's replication is complete on the target, the SPAWN(SF0,0) work item is promoted to the clones queue.

A worker fiber pulls the SPAWN(SF0, 0) work item from the clones queue, adds a SPAWN (SF0,1) to the clones queue, and replicates CL0T (i.e., child 0 of SF0).

A worker fiber pulls the SPAWN(SF0, 1) work item from the clones queue. Assuming for the sake of example that the queue is full, the fiber adds an ACTIVE(SF0,1,SF1,0) work item to the pending map and replicates SF1 (i.e., child 1 of SF0). When SF1's replication is complete on the target, the ACTIVE(SF0,1,SF1,0) work item is promoted to the clones queue.

A worker fiber pulls the ACTIVE(SF0,1,SF1,0) work item from the clones queue, adds an ACTIVE (SF0, 1,SF1,1) work item to the clones queue, and replicates CL11 (i.e., child 0 of SF1).

A worker fiber pulls the ACTIVE(SF0,1,SF1,1) work item from the clones queue. Assuming for the sake of example that the queue now has a free entry, the fiber adds a SPAWN (SF2,0) work item to the pending map, adds an ACTIVE (SF0,1,SF1,2) work item to the clones queue, and replicates SF2 (i.e., child 1 of SF1).

A worker fiber pulls the ACTIVE(SF0,1,SF1,2) work item from the clones queue and replicates CL13 (i.e., child 2 of SF1).

When SF2's replication is complete, the SPAWN(SF2, 0) work item is promoted from the pending map to the clones queue. A worker fiber pulls the SPAWN (SF2,0) work item from the clones queue, adds a SPAWN(SF2,1) work item to the clones queue, and replicates CL21 (i.e., child 0 of SF2).

A worker fiber pulls the SPAWN (SF2,1) work item from the clones queue and replicates CL22 (i.e., child 1 of SF2).

At this point, the entire clone tree has been replicated.

The examples described above are based on an assumption that the entire snapshot-file tree, beginning with SF0, needs to be replicated. However, in practice, only portions of the snapshot-file tree that have changed since the previous snapshot are replicated.

For example, with reference again to FIG. 10, if only SF5 and its children were newly created or modified and the remainder of the tree had already been replicated in the target file system, then only SF5 and its children would need to be replicated to the target file system.

Similarly, if only a portion of a cloned object has changed (e.g., the cloned object has diverged from its parent) since the last replication of the cloned object, then only that diverged portion may need to be replicated.

Figure 11:
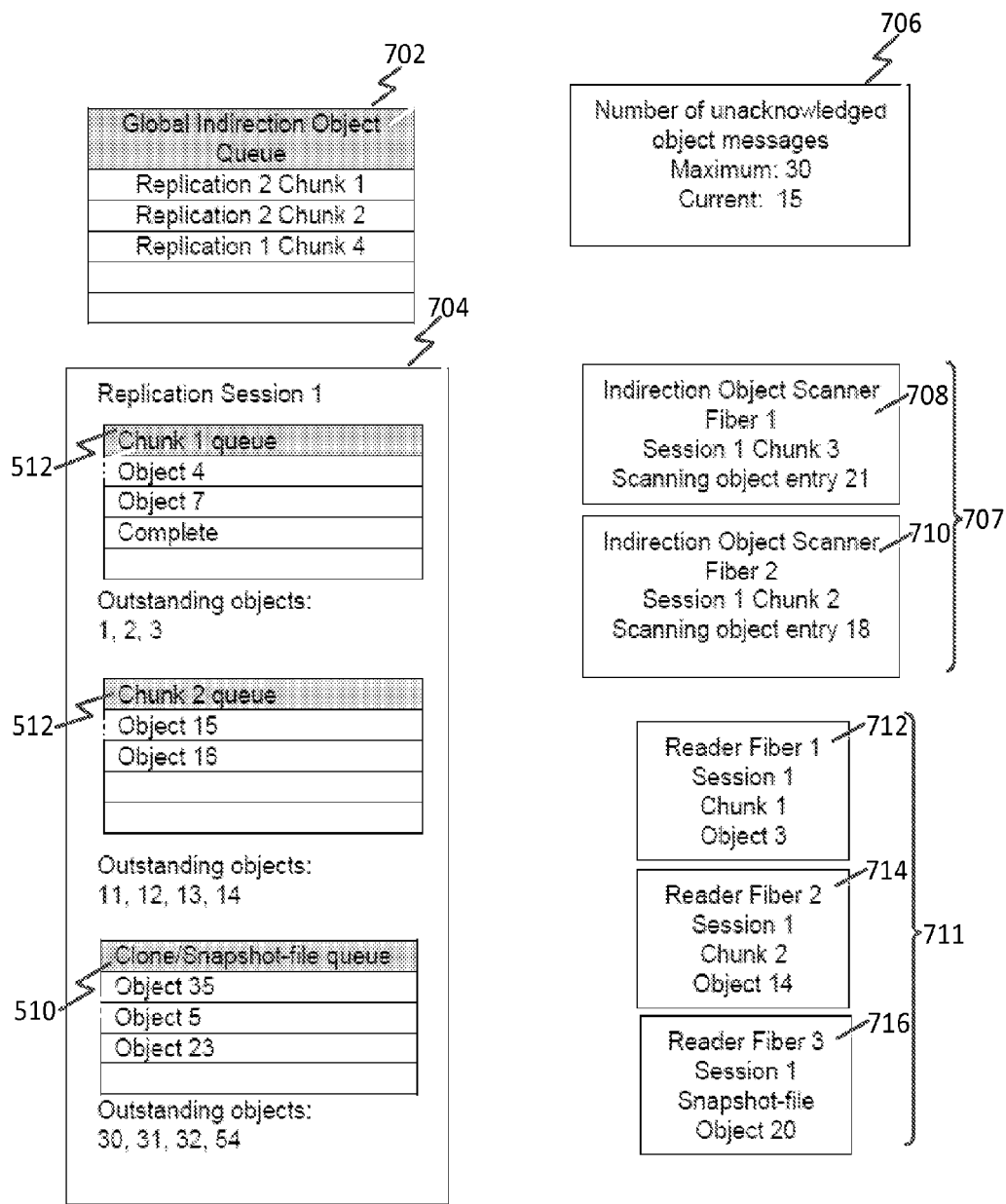
FIG. 11 is a schematic diagram showing representations of the types of source work queues and fibers maintained by the storage processor, in accordance with one exemplary embodiment.

FIG. 11 is a schematic diagram showing representations of the types of source work queues and fibers maintained by the storage processor 502, in accordance with one exemplary embodiment.

For each replication session, a set of queues 704 including Chunk Queues 512 and a clones queue 510 is maintained. A Global Indirection Object Queue 702 is used to track the indirection object chunks in each replication session that need to be processed by the indirection object scanner 707. In this example, indirection object chunk 4 in replication session 1 still needs to be processed, and indirection object chunks 1 and 2 in replication session 2 still need to be processed. An indirection object scanner fiber 708 is processing indirection object chunk 3 is replication session 1, and specifically is scanning object entry 21 in chunk 3. An indirection object scanner fiber 710 is processing indirection object chunk 2 in replication session 1, and specifically is scanning object entry 18 in chunk 2.

A pool of worker threads 711 (which may be referred to herein as "Changed Object Readers") pulls work items off the Chunk Queues (per chunk) 512 and the clones queue 510 and processes them. In this example, a first reader fiber 712 is processing a work item for object 3 in indirection object chunk 1 in replication session 1; a second reader fiber 714 is processing a work item for object 14 in indirection object chunk 2 in replication session 1; and a third reader fiber 716 is processing a work item for object 20 (a snapshot-file) in replication session 1.

The storage processor 502 also tracks 706 the number of outstanding (unacknowledged) object messages sent to the target file system relative to a predetermined maximum number of outstanding object messages and controls the replication session to ensure that the number of outstanding object messages does not exceed the predetermined maximum.

When all the chunks of the indirection object have been completed and acknowledged by the target, the source will wait until the pending map becomes empty and that any work item in the clones queue 510 is completed before destroying the queue 704 and closing the replication session.

In order to allow sharing the worker fibers between all the queues, the clones queue 510 is typically a chunk queue with a reserved chunk ID. Note that this queue is different from a normal Chunk Queue 512 as it processes work items for clone/snapshot-file objects from any chunk, work items are added to it by the worker fibers 711 and not the indirection object scanners 707, it is not limited by the size of a chunk, and its state should be saved to allow a replication restart.

As discussed above, in certain exemplary embodiments, when the total capacity of the global queue is used, the replication of a snapshot-file's successors will be carried out through an ACTIVE work item and no additional work items will be spawned in that process while the queue is full. This ensures that each work item generates at most one work item, thus preventing the total capacity of the global queue from being exceeded.

While the global queue is full, pre-existing work items that are in the pending queue may need to be added the clones queue. In one exemplary embodiment, entries in the clones queue are reserved for the work items that are in the pending map, and therefore calculating the number of free entries in the global queue takes into account the number of items in the pending map. Alternatively, a separate queue may be used to host such work items until they can be moved back to the clones queue when new entries become available.

In an exemplary embodiment, clones can be identified by examining a flag in the object's enode.

3.3.1. The DELETE Work Item

When processing a DELETE work item, the source sends an inquiry to the target to delete the object from the target file system.

3.3.2. The CREATE Work Item

When processing a CREATE work item and the object is a clone or a root snapshot-file, it is necessary to determine whether the object will be replicated by the current fiber or whether it will be replicated as part of its parent snapshot-file's tree and should be ignored by the current fiber. This is done as follows:

a. If the object is a clone and its parent snapshot-file is a new object, the object's replication is omitted by the current fiber.

b. If the object is a root snapshot-file or a clone with an old parent, the object is replicated by the current fiber. If the clone is a snapshot-file, a SPAWN work item to replicate its clones is added to the pending map. When the replication of the snapshot-file is complete, the source adds the pending SPAWN work item to the clones queue for processing.

In the case of a full replication where all objects are new, this process is simplified as follows:

If the object is a root snapshot-file, the object is replicated as in (b) above.

Otherwise the object's replication is omitted by the current fiber.

Figure 12:
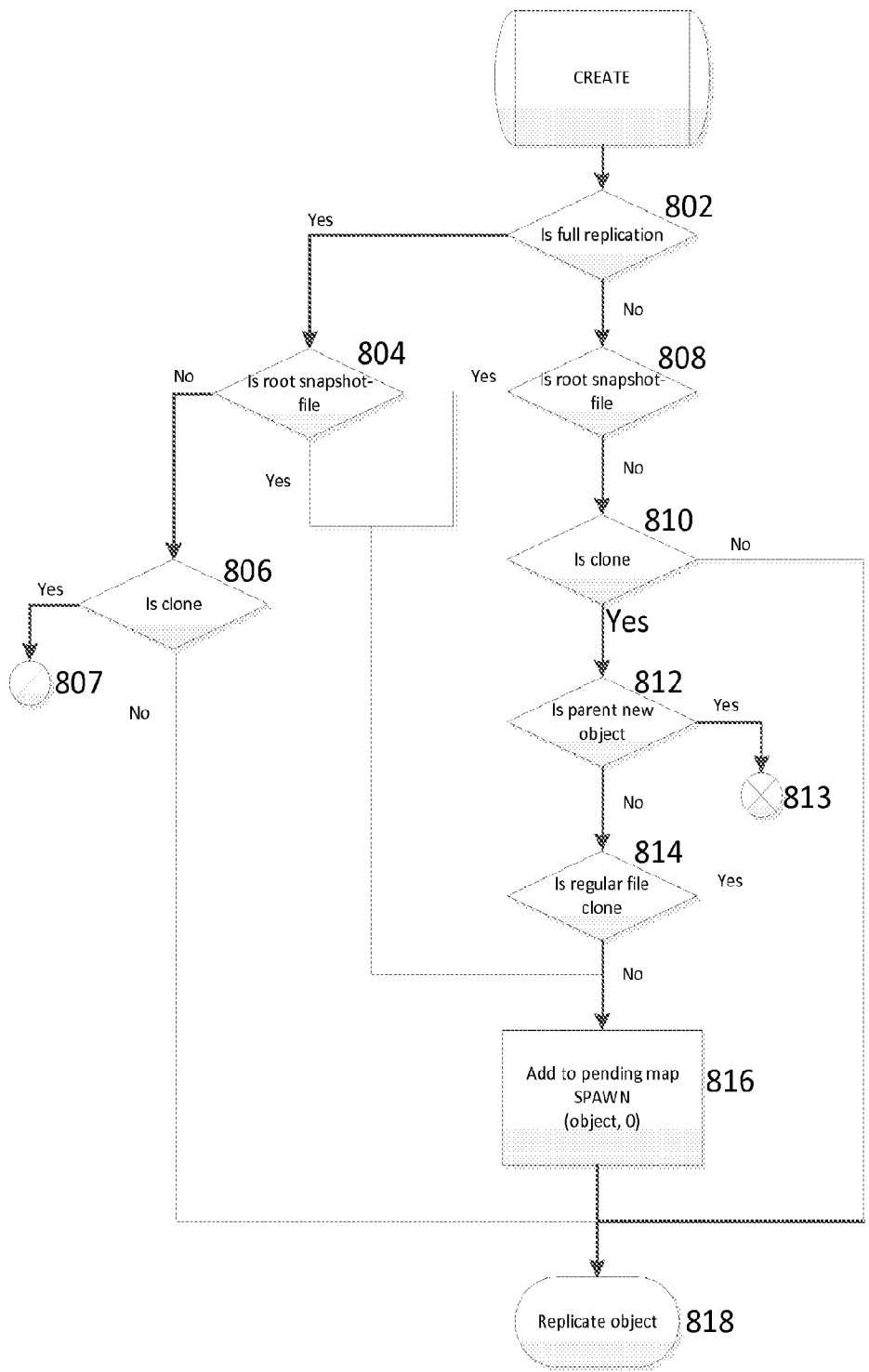
FIG. 12 is a state diagram for a CREATE work item, in accordance with one exemplary embodiment.

FIG. 12 is a state diagram for a CREATE work item, in accordance with one exemplary embodiment as just described.

In the case of a full replication (YES in block 802), if the object is a root snapshot-file (YES in block 804), then a SPAWN(object,0) work item is added to the pending map in block 816 and the object is replicated in block 818. If the object is a clone (NO in block 804, YES in block 806), then the object's replication is omitted by the current fiber in block 807. If the object is neither a clone nor a root snapshot-file (NO in block 804, NO in block 806), then the object is replicated in block 818.

In the case of incremental replication (NO in block 802), if the object is a root snapshot-file (YES in block 808), then then a SPAWN(object,0) work item is added to the pending map in block 816 and the object is replicated in block 818. If the object is a clone (NO in block 808, YES in block 810) and its parent snapshot-file is a new object (YES in block 812), then the object's replication is omitted by the current fiber in block 813. If the object is a clone (NO in block 808, YES in block 810) and its parent snapshot-file is an old object (NO in block 812), then if the clone is a snapshot-file (NO in block 814), a SPAWN(object,0) work item is added to the pending map in block 816 and the object is replicated in block 818; but if the clone is not a snapshot-file (YES in block 814), the object is replicated in block 818.

3.3.3. The SPAWN Work Item

When a fiber pulls a SPAWN work item from the clones queue to replicate the successors of a snapshot-file, the fiber will try to spawn the remaining branches of the snapshot-file tree if there is space in the queue to do so. It will then replicate the successor due for replication.

A SPAWN work item contains all the information necessary to replicate the clones of a given snapshot-file; for instance the snapshot-file's object number, the reference count (the reference count of a snapshot-file is the number of its immediate clones), the reference list (the reference list of a snapshot-file is the list of its immediate clones), and the reference offset (the reference offset of a snapshot-file is the index of the clone to replicate next in the reference list).

For convenience, a SPAWN work item for a snapshot-file "SF" and a reference offset "refOffset" will be represented by SPAWN(SF,refOffset). This work item will perform replication of child number "refOffset" of snapshot-file "SF." A SPAWN(SF, refOffset) work item is processed as follows:

1. Generate any new work items required to finish the replication of the snapshot-file tree, which is done first to allow other available fibers to process other parts of the snapshot-file tree in parallel:
   a. If the clone is a regular file and is not the last clone, a new SPAWN(SF, refOffset+1) work item to replicate the remaining clones is added to the clones queue.
   b. If the clone is a snapshot-file and it is the last clone, a SPAWN(clone,0) work item is added to the pending map to replicate the children of the clone starting with child 0.
   c. If the clone is a snapshot-file and it is not the last clone and the total queue is full, a new ACTIVE (SF,refOffset,clone,0) work item is added to the pending map.
   d. If the clone is a snapshot-file but it is not the last clone and the total queue is not full, a SPAWN(clone,0) work item is added to the pending map to replicate the children of the clone starting with child 0, and a SPAWN(SF,refOffset+1) work item is added to the queue to replicate the remaining clones of SF.
2. Replicate the clone.

In one exemplary embodiment, the worker fiber determine if an object is the last successor by comparing the reference offset against a reference count 'refCount' of the parent snapshot-file.

In one exemplary embodiment, in order to avoid having to visit the reference list of the snapshot-file multiple times, the reference list of the snapshot-file as well as the reference count of the snapshot-file are cached.

Figure 13:
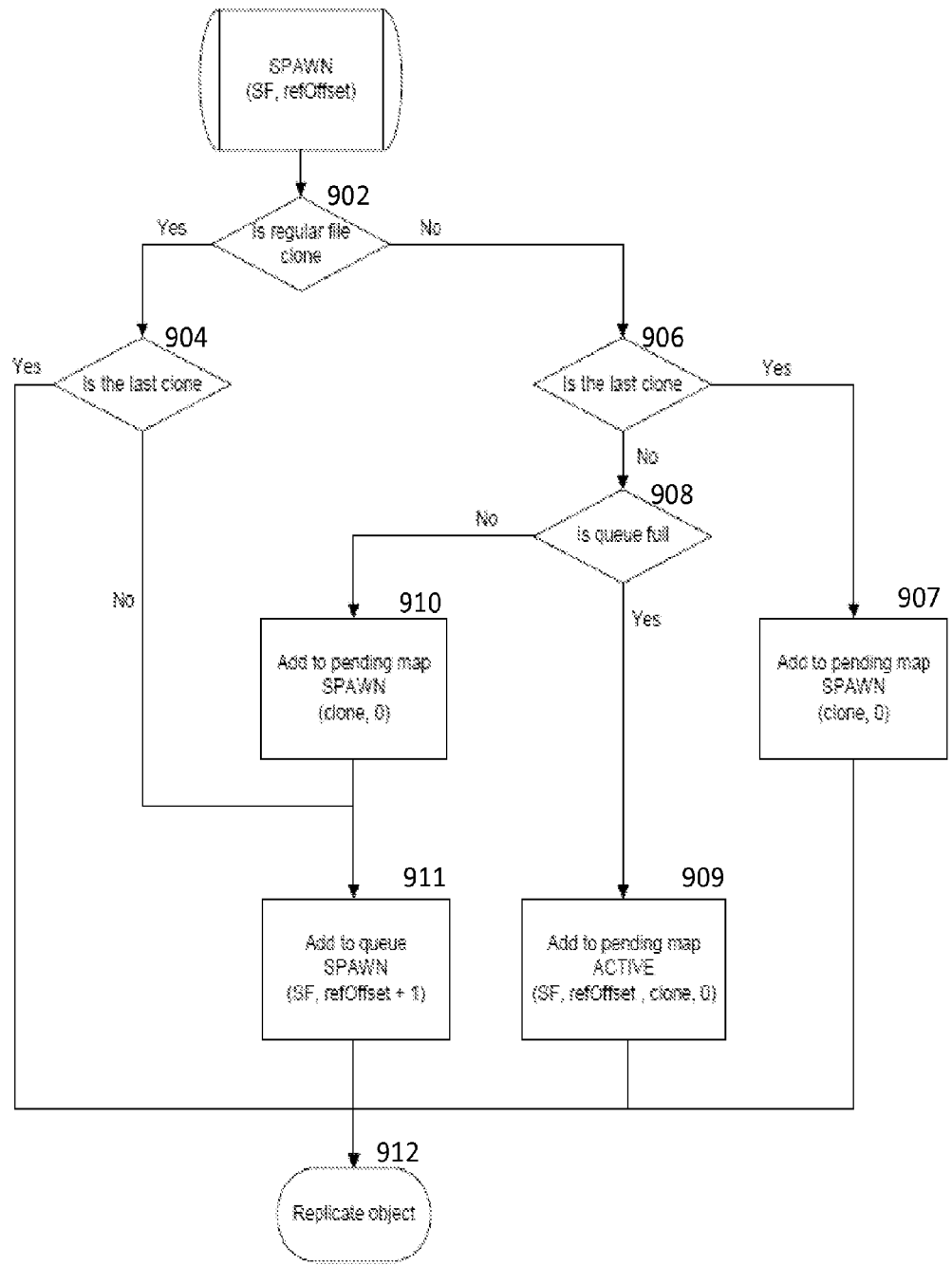
FIG. 13 is state diagram for a SPAWN work item, in accordance with one exemplary embodiment.

FIG. 13 is state diagram for a SPAWN work item, in accordance with one exemplary embodiment.

If the clone is a regular file (YES in block 902) and is not the last clone (NO in block 904), then a new SPAWN(SF, refOffset+1) work item to replicate the remaining clones is added to the clones queue in block 911, and the object is replicated in block 912.

If the clone is a regular file (YES in block 902) and is the last clone (YES in block 904), then the object is replicated in block 912 without adding any entries to the clones queue or pending map.

If the clone is a snapshot-file (NO in block 902) and it is the last clone (YES in block 906), then a SPAWN(clone,0) work item is added to the pending map in block 907, and the object is replicated in block 912.

If the clone is a snapshot-file (NO in block 902) and it is not the last clone (NO in block 906) and the total queue is full (YES in block 908), then a new ACTIVE (SF,refOffset,clone,0) work item is added to the pending map in block 909, and the clone is replicated in block 912.

If the clone is a snapshot-file (NO in block 902) but it is not the last clone (NO in block 906) and the total queue is not full (NO in block 908), then a SPAWN(clone,0) work item is added to the pending map in block 910 to replicate the children of the clone starting with child 0, a SPAWN(SF,refOffset+1) work item is added to the clones queue in block 911 to replicate the remaining clones of SF, and the clone is replicated in block 912.

3.3.4. The ACTIVE Work Item

When a fiber pulls an ACTIVE work item from the clones queue, the fiber will continue replicating objects in the root snapshot-file tree following a depth-first traversal while allowing some degree of parallel processing when resources allow. If the clone to replicate is a snapshot-file and the queue has a free entry, it adds a separate work item to replicate its tree to the pending map.

An ACTIVE work item contains the information required to complete the replication of a partially replicated snapshot-file tree, including:

1. The snapshot-file SF[0], its reference count, list and offset refOffset[0]; and
2. The snapshot-file SF[n] of the branch being replicated, its reference count, list and offset refOffset[n].

The clone replicated by this work item is clone number refOffset[n] of snapshot-file SF[n].

For convenience, an ACTIVE work item will be represented by ACTIVE(SF[0], refOffset[0], SF[n], refOffset[n]). An ACTIVE(SF[0], refOffset[0], SF[n], refOffset[n]) work item is processed as follows:

1. If the clone is a regular file and it is not the last clone, add an ACTIVE (SF[0], refOffset[0], SF[n], refOffset[n]+1) work item to the clones queue.
2. If the clone is a regular file and it is the last clone, iterate over the intermediate parents of SF[n] until:
   a. SF[0] is reached (which means that SF[0] was replicated in its entirety so no work items need to be generated); or
   b. A snapshot-file SF[i], where 0<i<n, which isn't the last clone of its snapshot-file SF[i−1], is found—If SF[i] is a direct clone of SF[0], it adds a SPAWN (SF[0], refOffset[0]+1) to the queue, otherwise it adds an ACTIVE (SF[0], refOffset[0], SF[i−1], refOffset[i−1]+1) work item to the queue as SF[i−1] was already replicated.
3. If the clone is a snapshot-file and the queue is full, it adds an ACTIVE (SF[0], refOffset[0], clone,0) work item to the pending map.
4. If the clone is a snapshot-file and the queue has a free entry, it adds a SPAWN (clone, 0) to the pending map and then iterates over the intermediate parents of SF[n] until:
   a. SF[0] is reached (which means that SF[0] was replicated in its entirety so no work items need to be generated); or
   b. A snapshot-file SF[i], where 0<i<n, which isn't the last clone of its snapshot-file SF[i−1], is found—If SF[i] is a direct clone of SF[0], it adds a SPAWN (SF[0], refOffset[0]+1) to the queue, otherwise it adds an ACTIVE (SF[0], refOffset[0], SF[i−1], refOffset[i−1]+1) work item to the queue as SF[i−1] was already replicated.

5. Replicate the clone.

In one exemplary embodiment, in order to avoid reading the enode and reference list of SF[n] each time a successor or SF[n] is replicated, the list of its successors and its reference count is cached.

Figure 14:
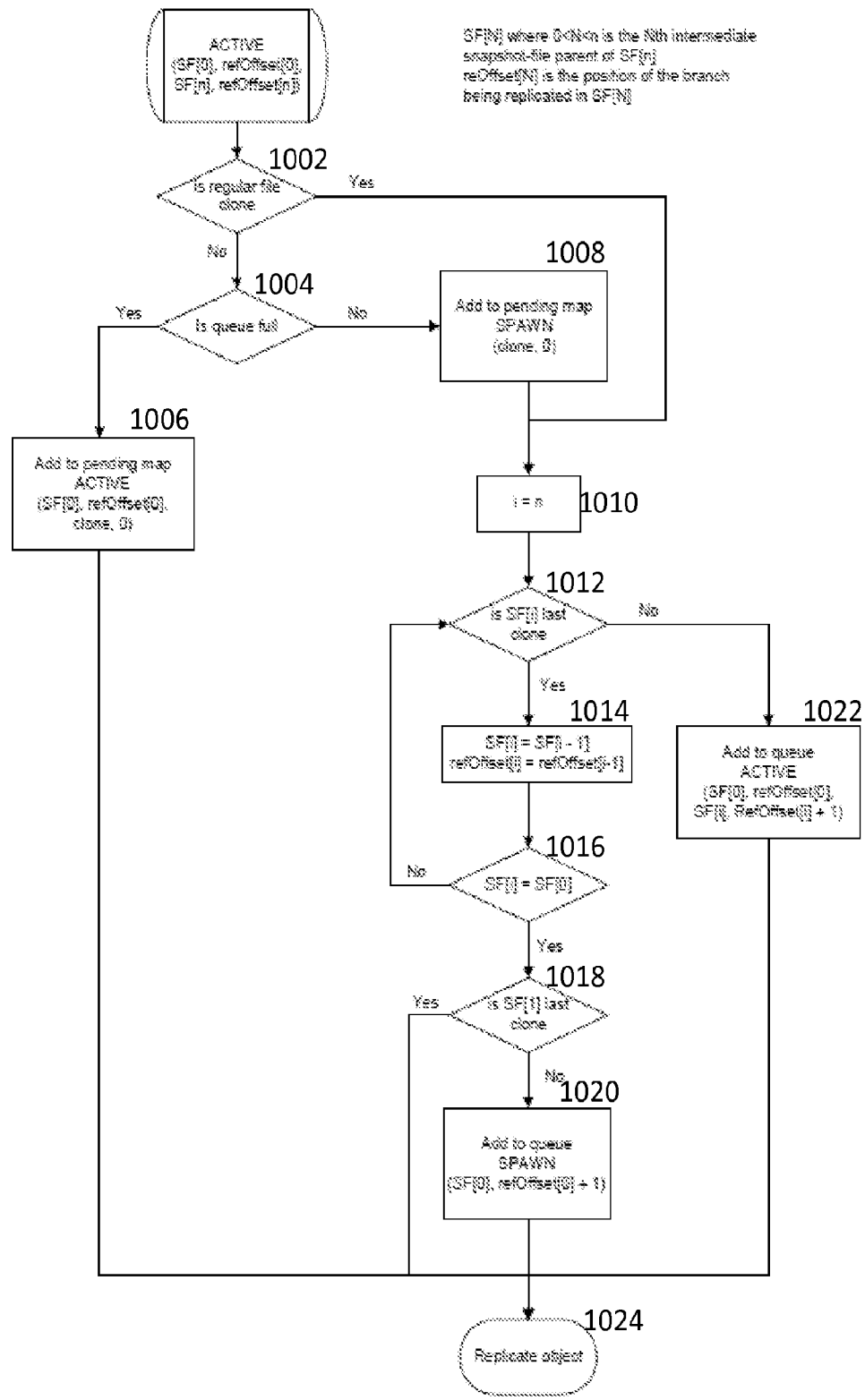
FIG. 14 is a state diagram for an ACTIVE work item, in accordance with one exemplary embodiment.

FIG. 14 is a state diagram for an ACTIVE work item, in accordance with one exemplary embodiment.

If the clone is a regular file (YES in block 1002) and it is not the last clone (via block 1010 in which an iteration variable "i" is initialized, NO in block 1012), then an ACTIVE (SF[0], refOffset[0], SF[n], refOffset[n]+1) work item is added to the clones queue in block 1022 and the clone is replicated in block 1024.

If the clone is a regular file (YES in block 1002) and it is the last clone (block 1010 in which an iteration variable "i" is initialized, YES in block 1012), then the logic iterates over the intermediate parents of SF[n] (blocks 1014, 1016, and 1012) until either a direct clone SF[1] of SF[0] is reached (YES in block 1016) or a snapshot-file SF[i], where 1<i<n, which isn't the last clone of its snapshot-file SF[i−1], is found (NO in block 1012). If direct clone SF[1] of SF[0] is reached (YES in block 1016), then if SF[1] is not the last clone of SF[0] (NO in block 1018) a SPAWN (SF[0], refOffset[0]+1) work item is added to the queue in block 1020 and the clone is replicated in block 1024; otherwise, if SF[1] is the last clone of SF[0] (YES in block 1018), the clone is replicated in block 1024. If, instead, a snapshot-file SF[i], where 1<i<n, which isn't the last clone of its snapshot-file SF[i−1], is found (NO in block 1012), then an ACTIVE (SF[0], refOffset[0], SF[i−1], refOffset[i−1]+1) work item is added to the queue in block 1022 and the clone is replicated in block 1024.

If the clone is a snapshot-file (NO in block 1002) and the queue is full (YES in block 1004), then an ACTIVE (SF[0], refOffset[0], clone,0) work item is added to the pending map in block 1006 and the clone is replicated in block 1024.

If the clone is a snapshot-file (NO in block 1002) and the queue has a free entry (NO in block 1004), then a SPAWN (clone, 0) work item is added to the pending map in block 1008 and then (via block 1010 in which an iteration variable "i" is initialized) the logic iterates over the intermediate parents of SF[n] (blocks 1012, 1014, 1016) until A direct clone SF[1] of SF[0] is reached (YES in block 1016) or a snapshot-file SF[i], where 1<i<n, which isn't the last clone of its snapshot-file SF[i−1], is found (NO in block 1012). If direct clone SF[1] of SF[0] is reached (YES in block 1016), then if SF[1] is not the last clone of SF[0] (NO in block 1018) a SPAWN (SF[0], refOffset[0]+1) work item is added to the queue in block 1020 and the clone is replicated in block 1024; otherwise, if SF[1] is the last clone of SF[0] (YES in block 1018), the clone is replicated in block 1024. If, instead, a snapshot-file SF[i], where 1<i<n, which isn't the last clone of its snapshot-file SF[i−1], is found (NO in block 1012), then an ACTIVE (SF[0], refOffset[0], SF[i−1], refOffset[i−1]+1) work item is added to the queue in block 1022 and the clone is replicated in block 1024.

3.3.5. The MODIFY Work Item

The MODIFY work item applies to objects that already have been replicated to the target file system but have changed since the previous snapshot. Modifications to a regular file clone object on a live file system result from:

1. Decloning the object when all its user/metadata blocks become diverged, which can result in the deletion of the parent snapshot-file if the object was its last clone;

2. Changing its parent:

a. When a snapshot-file tree is simplified, when its reference count drops to 1, resulting in the deletion of intermediate snapshot-files. The cloned-in-checkpoint number in this case is less than the checkpoint number of the previous snapshot; or b. When a clone is decloned and then cloned again. The cloned-in-checkpoint number in this case is greater than or equal to the checkpoint number of the previous snapshot;

3. Cloning the source data stream that is a regular file object, which generates two new objects, namely the snapshot-file and the new clone—the source data stream becomes a clone of the snapshot-file, and has a cloned-in-checkpoint number greater than or equal to the checkpoint number of the previous snapshot; or 4. Simply diverging additional user/metadata blocks of the object—the cloned-in-checkpoint number in this case is lower than the checkpoint number of the previous snapshot.

When a source data stream that has already been replicated to the target file system is cloned, a snapshot-file and a clone object will be created, as represented by the following:

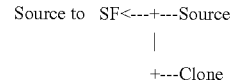

In this case, when scanning the indirection object, the indirection object scanner fiber would see Source as being a modified object and add a MODIFY work item for it, SF as being a new object, and Clone as being a new object. However, in this case, Source should be replicated as part of the replication of SF and thus the reader fiber executing the MODIFY work item for Source will not proceed with replication of Source, as set forth below. The reader fiber can determine that Source is the source data stream by checking the cloned-in-checkpoint number of Source, and if the cloned-in-checkpoint number is greater than the previous file system snapshot's checkpoint, then Source is the source data stream.

When processing a MODIFY work item from a chunk queue, such transitions are detected and handled specifically:

1. If a non-clone regular file object was a clone in the previous snapshot, the object was decloned. Such an object is deep copied, that is, all its user/metadata blocks are replicated.

2. If the object's cloned-in-checkpoint number is greater than the checkpoint number of the previous snapshot:

If the parent snapshot-file is a new object, the object is either a clone that was the source data stream or a clone that was decloned then cloned. In both cases, the objects will be replicated from scratch as part of the replication of their parent snapshot-file. The replication of such objects is omitted by the processing fiber.

Otherwise, the object is recreated on the target. This is possible if the previous snapshot was taken when the clone was partially cloned; that is, the snapshot-file was created in the previous snapshot but the clone was cloned after that.

3. If the object is a clone with a cloned-in-checkpoint number is less than the checkpoint number of the previous snapshot and a different parent from the previous snapshot, the clone's parent has changed. All the diverged user/metadata blocks from the new parent are replicated.

4. Otherwise, if the object is a clone, it is a more diverged clone and it is replicated like any other objects. Only the changed diverged user/metadata blocks are replicated in this case.

Unlike on the target file system, some of the special cases covered in (1), (2) and (3) above involve some degree of user/metadata blocks transfer between objects on a live file system.

For example, in the case where a snapshot-file tree is simplified, the user/metadata blocks owned by the intermediate deleted parents are transferred to the clone. If such user/metadata blocks have not changed since the previous snapshot, these could be reused instead of being transferred and written to new space on the target file system.

Also, in the case where the object is the source data stream, its user/metadata blocks are transferred to the snapshot-file it has cloned. If these user/metadata blocks have not changed since the previous snapshot, they could be reused instead of being transferred and rewritten to new space on the target file system.

Although it is possible to optimize these scenarios, the overall added benefit does not always outweigh the additional processing involved.

Figure 15:
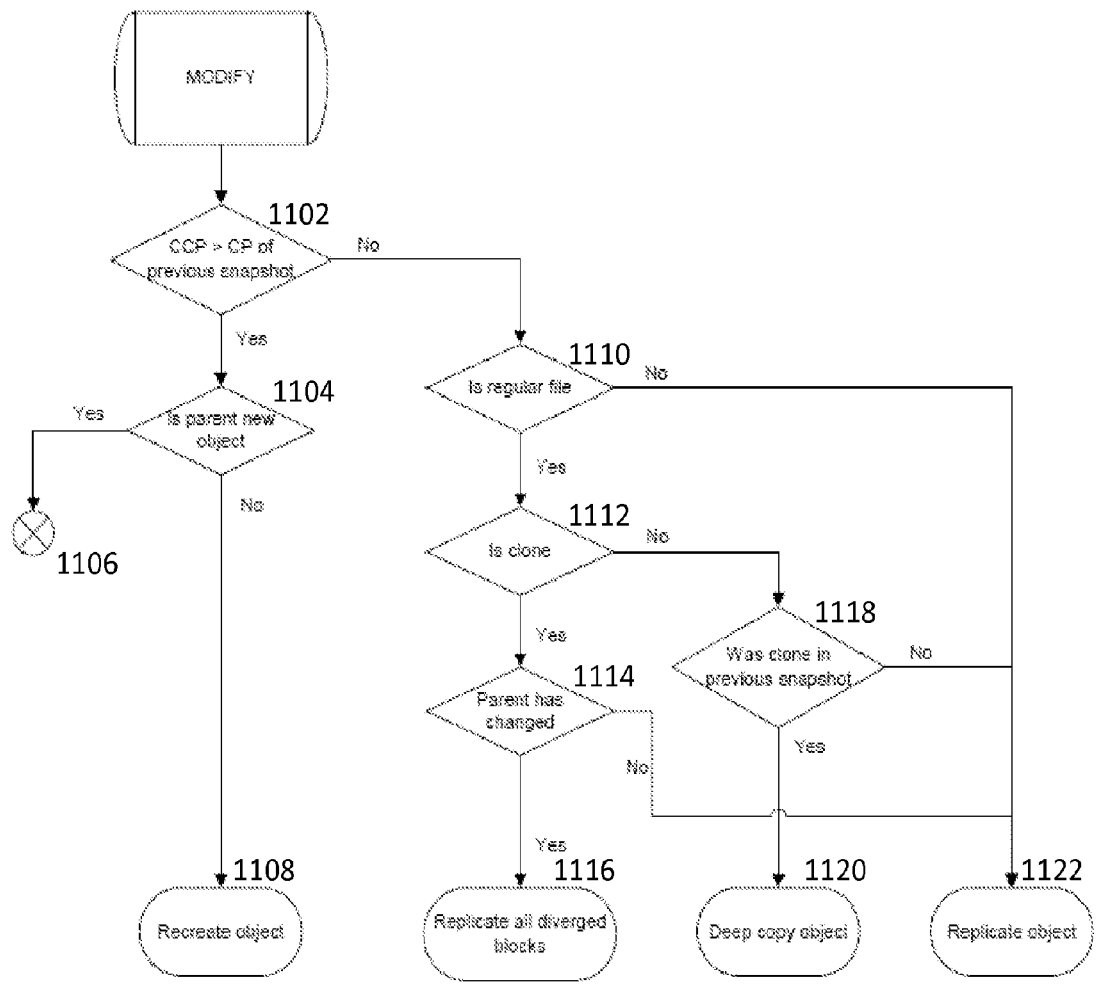
FIG. 15 is a state diagram for a MODIFY work item, in accordance with one exemplary embodiment.

FIG. 15 is a state diagram for a MODIFY work item, in accordance with one exemplary embodiment.

If the cloned-in-checkpoint number (CCP) is greater than the checkpoint number of the previous snapshot (YES in block 1102) and the parent snapshot-file is a new object (YES in block 1104), then the object will be replicated from scratch as part of the replication of its parent snapshot-file and so replication of the object is omitted by the processing fiber in block 1106.

If the cloned-in-checkpoint number (CCP) is greater than the checkpoint number of the previous snapshot (YES in block 1102) and the parent snapshot-file is not a new object (NO in block 1104), then the object is recreated in full on the target file system.

If the cloned-in-checkpoint number (CCP) is not greater than the checkpoint number of the previous snapshot (NO in block 1102) and the object is not a regular file (NO in block 1110), then the object is replicated in block 1122).

If the cloned-in-checkpoint number (CCP) is not greater than the checkpoint number of the previous snapshot (NO in block 1102) and the object is not a regular file clone (YES in block 1110, NO in block 1112), then if the object was a clone in the previous snapshot (YES in block 1118), then the object is deep copied in block 1120, otherwise (NO in block 1118) the object is replicated in block 1122.

If the cloned-in-checkpoint number (CCP) is not greater than the checkpoint number of the previous snapshot (NO in block 1102) and the object is a regular file clone (YES in block 1110, YES in block 1112), then if the parent has changed (YES in block 1114), then all diverged blocks are replicated in block 1116, otherwise (NO in block 1114) the object is replicated in block 1122.

4. Some Potential Optimizations 4.1. Detection of Decloned Clones

A "WasAClone" flag could be used (e.g., added to the enode information) for regular file type objects to indicate whether the object was ever a clone. This flag would be set when the clone is first decloned. Among other things, this flag would avoid reading the SMO's enode in the previous snapshot to check if the object was a clone for regular file objects that have never been clones.

4.2. Detection of a Clone's Parent Change

The checkpoint number where a clone parent has last changed could be saved in the clone's SMO's enode. If this checkpoint number is greater than the previous snapshot checkpoint number, then this implies that a parent change has occurred since the previous snapshot. Among other things, this would avoid reading the SMO's enode in the previous snapshot for clones that did not have their parent changed since the previous snapshot.

4.3. Throttling the Replication of Snapshot-Files

One possible optimization could consist of prioritizing the work items in the clones queue by starting with those that involve the replication of a successor at position refOffset such as (refCount-refOffset) is minimal; where refCount is the reference count of the parent snapshot-file.

Another possible optimization could consist of prioritizing work items that do not involve the replication of a snapshot file in the chunk queues (excluding the clones queue); these work items can be easily identified by checking the object type. This can be used to control the number of work items in the pending map when it reaches a certain limit, for example, (total queue capacity/number of active replications/8, default 512).

4.4. Case where Source Data Stream Exists in Previous Snapshot

When creating a new snapshot-file without a parent during a replication, the object is replicated in its entirety without reusing any duplicate data in the presence of the source data stream in the older snapshot. This means that any shared data with the source data stream is being transmitted from the source to the target, thus generating unnecessary traffic between both ends.

A worst case scenario is when the source data stream has not changed since the older snapshot, and therefore has not diverged from its snapshot-file. In this case, all the data of the source data stream is re-written to the target to create the snapshot-file then truncated from the source data stream.

It is possible to optimize this case by identifying the source data stream in the older snapshot and using it to create the snapshot-file.

Each snapshot-file maintains a list of objects referencing it. As the source data stream is the first object to reference the snapshot-file, it is the first to be added to the list.

This is not necessarily true in the case of the target file system (i.e., the target file system), where the source data stream can be created after its snapshot-file and therefore can be added anywhere to the reference list. This case, however, is not relevant as when the optimization applies, the source data stream exists in the older snapshot but not the snapshot-file, which ensures that the snapshot-file was created first in the source file system.

It is therefore sufficient to get the first object in the reference list and check that it already exists in the older snapshot by comparing its creation checkpoint number with the older snapshot checkpoint number.

Note that if the source data stream was deleted in the current snapshot or has completely diverged from its snapshot-file, it cannot be located on the older snapshot even if it existed there.

It is possible to optimize the snapshot file creation if the source data stream is identified and exists in the older snapshot as follows:

Deduce data block changes between the snapshot-file in the current snapshot and the source data stream in the older snapshot.

Patch the source data stream with these differences on the target so that it matches the snapshot-file. This brings the source data stream on the target to the state where it was cloned.

Create a snapshot-file and associate the source data stream.

Deduce data block changes between the source data stream in the current snapshot and the snapshot-file and write these to the source data stream on the target. This will create the diverged data blocks of the source data stream on the target.

Note that if the ordering of the list of references to the snapshot-file changes in software, it is necessary to search the entire list; otherwise the optimization will simply not apply.

This optimization also avoids trying to create the source data stream on the target when it already exists. It is, however, less efficient if the source data stream has diverged heavily from its snapshot-file, as it will generate unnecessary traffic between the source and the target in this case. The worst case scenario is when the source data stream has heavily changed between the older snapshot and the time it was cloned, then changed back to match its state in the older snapshot. Instead of simply writing the snapshot-file, this will modify the source data stream to match the snapshot-file then back to its original state. This is however a less common scenario.

Knowing that clones do not heavily diverge from their snapshot files in general, implementing the optimization would still be beneficial. Also having an indication of how much a source data stream has diverged from its snapshot-file can help decide whether or not to apply the optimization.

5. Alternative Clone Replication Methods 5.1. Replication of Clone/Snapshot-File Objects and any Parent When replicating a clone or a snapshot-file with a parent, the source finds out if the snapshot-file it references already exists in the older snapshot, in which case it replicates it. Otherwise it iterates over the parent snapshot-files in line until it finds one with a replicated parent or the root. It then starts replicating the snapshot-files successively starting with the last found. The clone is the last to be replicated.

In order to avoid blocking the scanning of the indirection object while replicating all the required snapshot-file parents in sequence, the source needs to maintain a separate queue for the creation of clone and snapshot-file objects.

As a snapshot-file can have multiple successors, it is necessary to keep track of the snapshot-file parents that need to be replicated in a list. If the number of parents to replicate is large, this list will use a significant amount of memory resources.

All snapshot-files created during this process will be encountered later during replication, when their entry in the indirection object is scanned. This can be addressed in at least two ways:

1. The source can query the target if a snapshot-file has already been replicated during the current replication session. This will generate additional traffic between the source and the target.

2. The source attempts to replicate the snapshot-file object and sends an inquiry to create it. The target will find the object was already created and will return an error. This will also generates overhead traffic between both ends.

5.2. Multi-Pass Replication

This method consists of performing the replication in multiple passes; the indirection object is scanned for changes at each pass.

During the first pass, the source finds out if the parent of a clone or a snapshot-file already exists in the older snapshot, in which case it replicates it. Otherwise it omits its replication.

During the second pass, only clone or snapshot-file objects with parents that do not exist in the older snapshot are considered. The source iterates over all the parent snapshot-files in line until it finds one with a replicated parent or the root. As this object has now been replicated during the first pass, it replicates its immediate successor in the branch being traversed.

The replication will perform multiple passes to replicate all the remaining clone and snapshot-file objects. At each pass N, only objects of depth D−N+1 in each snapshot-file branch will be created; where D is the position of the object in the branch being traversed.

At each pass, it is possible to estimate the number of remaining passes and objects to replicate in order to complete the replication session.

This method requires significant additional processing to scan the indirection object and traverse the snapshot-file tree branches at each pass.

During pass N, the same snapshot-file can hold position D−N+1 in multiple branches if it has for example multiple clones. This results in attempting to replicate the snapshot-file multiple times. This can be avoided by keeping track of the snapshot-files being replicated during the current pass.

5.3. Two Stage Replication

In this case, the replication is performed in two parts:

1. A part where all changed snapshot-file and clone objects are replicated. The root snapshot-files are identified during the scanning of the indirection object. Each snapshot-file tree is scanned for changes starting from the root and any changes replicated to the target in this order.

2. Another part consisting of a normal replication which omits clone and snapshot-file objects.

Both parts can be run in parallel and multiple fibers used to scan a single root snapshot-file. The source needs to maintain a separate queue for the creation of clone and snapshot-file objects. This method however involves scanning the indirection object twice.

5.4. Replication Performed in Target

In various alternative embodiments, replication may be performed by the source sending some or all of the new snapshot to the target and the target performing the replication substantially without further interaction with the source in accordance with various replication techniques discussed above.

6. Miscellaneous

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A non-transitory computer readable storage medium comprising computer-readable program instructions which, when running on or loaded into one or more file system servers of a data storage system or computer connected to the one or more file system servers or when being executed by one or more processors or processing units of the one or more file system servers or the computer, cause the data storage system to execute a method for replicating file system objects, including snapshot-file objects and clone objects, from a source file system to a target file system in the data storage system, the method comprising:

creating a read-only snapshot-file object in the source file system that is associated with a first plurality of blocks that store data and are associated with a plurality of checkpoint numbers;

creating a first clone object in the source file system that is associated with at least the first plurality of blocks associated with the read-only snapshot file object;

creating a cloned-in-checkpoint number for the first clone object;

replicating the read-only snapshot-file object from the source file system to the target file system to create a replicated snapshot-file object;

creating a second clone object sharing associated blocks with the replicated snapshot-file object in the target file system; and upon modification of the first clone object in the source file system resulting in an association between the first clone object and at least one diverged block, wherein the at least one diverged block corresponds to a new block or a modified block of the first plurality of blocks;

creating a new checkpoint number corresponding to the at least one diverged block and replicating the at least one diverged block associated with the first clone object from the source file system to the target file system, wherein replicating the at least one diverged block associated with the first clone object from the source file system to the target file system comprises:

detecting at least one block of the first clone object in the source file system which has changed since creation of the first clone object in the source file system based on comparing checkpoint numbers which are associated with blocks of the first clone object in the source file system with the cloned-in-checkpoint number of the first clone object in the source file system;

transferring, from the source file system to the target file system, blocks having a checkpoint number higher than or equal to the cloned-in-checkpoint number of the first clone object in the source file system; and updating the second clone object in the target file system based on blocks received from the source file system so that the second clone object associates with the replicated at least one diverged block in addition to the blocks associated with the replicated snapshot-file object.

2. The non-transitory computer readable storage medium according to claim 1, wherein, when the first clone object has been created in the source file system since a previous replication cycle, the read-only snapshot-file object is replicated from the source file system to the target file system in the previous replication cycle or in a current replication cycle.

3. The non-transitory computer readable storage medium according to claim 2, wherein the at least one diverged block associated with the first clone object is replicated from the source file system to the target file system in the current replication cycle.

4. The non-transitory computer readable storage medium according to claim 1, wherein the at least one diverged block associated with the first clone object is replicated from the source file system to the target file system after replicating the read-only snapshot-file object from the source file system to the target file system and creating the second clone object in the target file system.

5. The non-transitory computer readable storage medium according to claim 1, wherein creating the second clone object sharing associated blocks with the replicated snapshot-file object in the target file system is based on metadata obtained from the source file system.

6. The non-transitory computer readable storage medium according to claim 1, the method further comprising:

ensuring that a cloned-in-checkpoint number of the created second clone object in the target file system is higher than checkpoint numbers of the blocks associated with the associated replicated snapshot-file object, wherein the cloned-in-checkpoint number of the created clone object in the target file system corresponds to a checkpoint number at which the created clone object was associated with the replicated snapshot-file object.

7. The non-transitory computer readable storage medium according to claim 6, wherein ensuring that the cloned-in-checkpoint number of the created second clone object in the target file system is higher than checkpoint numbers of the blocks of the associated replicated snapshot-file object comprises:

setting, when a last modified checkpoint number of the associated replicated snapshot-file object in the target file system is different from a current checkpoint number of the target file system, the cloned-in-checkpoint number of the created second clone object to the current checkpoint number of the target file system; and issuing, when the last modified checkpoint number of the associated replicated snapshot-file object in the target file system is equal to the current checkpoint number of the target file system, a new checkpoint in the target file system to advance the current checkpoint number of the target file system, and setting the cloned-in-checkpoint number of the created second clone object to the advanced checkpoint number of the target file system.

8. The non-transitory computer readable storage medium according to claim 1, wherein, when a third clone object has been replicated in a previous replication cycle to the target file system as regular file system object and has gained the properties of a clone object since the previous replication cycle and an associated another read-only snapshot-file object has been previously replicated to the target file system, the method further comprises:

transferring metadata for the third clone object and the associated another read-only snapshot-file object from the source file system to the target file system; and recreating the clone object in the target file system as a fourth clone object sharing the associated blocks with the associated replicated another snapshot-file object based on the metadata from the source file system and the previously replicated snapshot-file object on the target file system; wherein, when the third clone object has been modified in the source file system and is associated with at least one diverged block other than the blocks shared with the another read-only snapshot-file object in the source file system, the at least one diverged block associated with the third clone object is replicated from the source file system to the target file system.

9. The non-transitory computer readable storage medium according to claim 8, the method further comprising:

determining when the third clone object has been replicated in the previous replication cycle to the target file system as regular file system object and has gained the properties of a clone object since the previous replication cycle based on a cloned-in-checkpoint number of the third clone object in the source file system.

10. The non-transitory computer readable storage medium according to claim 1, wherein, when a third clone object has been previously replicated to the target file system and has become associated with another read-only snapshot-file object in the source file system since a last replication cycle, the method further comprises replicating at least one diverged block other than the blocks shared with the another read-only snapshot-file object in the source file.

11. The non-transitory computer readable storage medium according to claim 1, wherein, when the source file system includes a regular file system object which was a clone object previously replicated to the target file system and decloned since a previous replication cycle, the method further comprises replicating the regular file system object from the source file system to the target file system including replicating the blocks associated with the regular file system object.

12. The non-transitory computer readable storage medium according to claim 1, wherein replicating the read-only snapshot-file object from the source file system to the target file system comprises:

adding a first work item to a clones queue for replication of the read-only snapshot-file object, adding a second work item to a pending map for subsequent replication of the associated first clone object, executing the first work item to replicate the read-only snapshot-file object, and moving, upon completion of such replication of the read-only snapshot-file object, the second work item from the pending map to the clones queue; and replicating the associated first clone object comprises:

adding an initial work item for the replication of the associated first clone object to a chunk queue, and executing the initial work item including replicating, when the read-only snapshot-file object is an old object, the associated first clone object to the target file system, and terminating, when the read-only snapshot-file object is a new object, execution of the initial work item without replicating the associated first clone object to the target file system.

13. A method for replicating file system objects including snapshot-file objects and clone objects from a source file system to a target file system in a data storage system, the method comprises:

creating a read-only snapshot-file object in the source file system that is associated with a first plurality of blocks that store data and are associated with a plurality of checkpoint numbers;

creating a first clone object in the source file system that is associated with at least the first plurality of blocks associated with the read-only snapshot file object;

creating a cloned-in-checkpoint number for the first clone object;

replicating the read-only snapshot-file object from the source file system to the target file system to create a replicated snapshot-file object;

creating a second clone object sharing associated blocks with the replicated snapshot-file object in the target file system; and upon modification of the first clone object in the source file system resulting in an association between the first clone object and at least one diverged block, wherein the at least one diverged block corresponds to a new block or a modified block of the first plurality of blocks;

creating a new checkpoint number corresponding to the at least one diverged block and replicating the at least one diverged block associated with the first clone object from the source file system to the target file system, wherein replicating the at least one diverged block associated with the first clone object from the source file system to the target file system comprises:

detecting at least one block of the first clone object in the source file system which has changed since creation of the first clone object in the source file system based on comparing checkpoint numbers which are associated with blocks of the first clone object in the source file system with the cloned-in-checkpoint number of the first clone object in the source file system;

transferring, from the source file system to the target file system, blocks having a checkpoint number higher than or equal to the cloned-in-checkpoint number of the first clone object in the source file system; and updating the second clone object in the target file system based on blocks received from the source file system so that the second clone object associates with the replicated at least one diverged block in addition to the blocks associated with the replicated snapshot-file object.

14. The method according to claim 13, further comprising at least one of:

(a) when the first clone object has been created in the source file system since a previous replication cycle, the read-only snapshot-file object is replicated from the source file system to the target file system in the previous replication cycle or in a current replication cycle;

(b) when the first clone object has been created in the source file system since a previous replication cycle, the read-only snapshot-file object is replicated from the source file system to the target file system in the previous replication cycle or in a current replication cycle and the at least one diverged block associated with the first clone object is replicated from the source file system to the target file system in the current replication cycle;

(c) the at least one diverged block associated with the first clone object is replicated from the source file system to the target file system after replicating the read-only snapshot-file object from the source file system to the target file system and creating the second clone object in the target file system;

(d) creating the second clone object sharing associated blocks with the replicated snapshot-file object in the target file system is based on metadata obtained from the source file system;

(e) replicating the at least one diverged block associated with the first clone object from the source file system to the target file system comprises:
  (i) detecting at least one block of the first clone object in the source file system which has changed since creation of the first clone object in the source file system based on comparing checkpoint numbers which are associated with blocks of the first clone object in the source file system with a cloned-in-checkpoint number of the first clone object in the source file system;
  (ii) transferring, from the source file system to the target file system, blocks having a checkpoint number higher than or equal to the cloned-in-checkpoint number of the first clone object in the source file system; and
  (iii) updating the second clone object in the target file system based on blocks received from the source file system;

(f) when a third clone object has been replicated in a previous replication cycle to the target file system as regular file system object and has gained the properties of a clone object since the previous replication cycle and an associated another read-only snapshot-file object has been previously replicated to the target file system, the method further comprises:
  (i) transferring metadata for the third clone object and the associated another read-only snapshot-file object from the source file system to the target file system; and
  (ii) recreating the clone object in the target file system as a fourth clone object sharing the associated blocks with the associated replicated another snapshot-file object based on the metadata from the source file system and the previously replicated snapshot-file object on the target file system; wherein, when the third clone object has been modified in the source file system and is associated with at least one diverged block other than the blocks shared with the another read-only snapshot-file object in the source file system, the at least one diverged block associated with the third clone object is replicated from the source file system to the target file system;

(g) when a third clone object has been previously replicated to the target file system and has become associated with another read-only snapshot-file object in the source file system since a last replication cycle, the method further comprises replicating at least one diverged block other than the blocks shared with the another read-only snapshot-file object in the source file;

(h) when the source file system includes a regular file system object which was a clone object previously replicated to the target file system and decloned since a previous replication cycle, the method further comprises replicating the regular file system object from the source file system to the target file system including replicating the blocks associated with the regular file system object; or (i) replicating the read-only snapshot-file object from the source file system to the target file system comprises adding a first work item to a clones queue for replication of the read-only snapshot-file object, adding a second work item to a pending map for subsequent replication of the associated first clone object, executing the first work item to replicate the read-only snapshot-file object, and moving, upon completion of such replication of the read-only snapshot-file object, the second work item from the pending map to the clones queue; and wherein replicating the associated first clone object comprises adding an initial work item for the replication of the associated first clone object to a chunk queue, and executing the initial work item including replicating, when the read-only snapshot-file object is an old object, the associated first clone object to the target file system, and terminating, when the read-only snapshot-file object is a new object, execution of the initial work item without replicating the associated first clone object to the target file system.

15. The method of claim 13, further comprising at least one of:
(a) determining when the first clone object has been replicated in a previous replication cycle to the target file system as regular file system object and has gained the properties of a clone object since the previous replication cycle based on a cloned-in-checkpoint number of the first clone object in the source file system; or
(b) ensuring that a cloned-in-checkpoint number of the created second clone object in the target file system is higher than checkpoint numbers of the blocks associated with the associated replicated snapshot-file object, wherein the cloned-in-checkpoint number of the created second clone object in the target file system corresponds to a checkpoint number at which the created second clone object was associated with the replicated snapshot-file object.

16. The method according to claim 15, wherein ensuring that the cloned-in-checkpoint number of the created second clone object in the target file system is higher than checkpoint numbers of the blocks of the associated replicated snapshot-file object comprises:
setting, when a last modified checkpoint number of the associated replicated snapshot-file object in the target file system is different from a current checkpoint number of the target file system, the cloned-in-checkpoint number of the created second clone object to the current checkpoint number of the target file system; and
issuing, when the last modified checkpoint number of the associated replicated snapshot-file object in the target file system is equal to the current checkpoint number of the target file system, a new checkpoint in the target file system to advance the current checkpoint number of the target file system, and setting the cloned-in-checkpoint number of the created second clone object to the advanced checkpoint number of the target file system.

17. A data storage system for replicating file system objects, including snapshot-file objects and clone objects, from a source file system to a target file system, the system including one or more file servers comprising at least one processor configured to execute:

creating a read-only snapshot-file object in the source file system that is associated with a first plurality of blocks that store data and are associated with a plurality of checkpoint numbers;

creating a first clone object in the source file system that is associated with at least the first plurality of blocks associated with the read-only snapshot file object;

creating a cloned-in-checkpoint number for the first clone object;

replicating the read-only snapshot-file object from the source file system to the target file system to create a replicated snapshot-file object;

creating a second clone object sharing associated blocks with the replicated snapshot-file object in the target file system; and upon modification of the first clone object in the source file system resulting in an association between the first clone object and at least one diverged block, wherein the at least one diverged block corresponds to a new block or a modified block of the first plurality of blocks;

creating a new checkpoint number corresponding to the at least one diverged block and replicating the at least one diverged block associated with the first clone object from the source file system to the target file system, wherein replicating the at least one diverged block associated with the first clone object from the source file system to the target file system comprises: detecting at least one block of the first clone object in the source file system which has changed since creation of the first clone object in the source file system based on comparing checkpoint numbers which are associated with blocks of the first clone object in the source file system with the cloned-in-checkpoint number of the first clone object in the source file system;

transferring, from the source file system to the target file system, blocks having a checkpoint number higher than or equal to the cloned-in-checkpoint number of the first clone object in the source file system; and updating the second clone object in the target file system based on blocks received from the source file system so that the second clone object associates with the replicated at least one diverged block in addition to the blocks associated with the replicated snapshot-file object.

18. The data storage system according to claim 17, wherein at least one of:

(a) when the first clone object has been created in the source file system since a previous replication cycle, the read-only snapshot-file object is replicated from the source file system to the target file system in the previous replication cycle or in a current replication cycle;

(b) when the first clone object has been created in the source file system since a previous replication cycle, the read-only snapshot-file object is replicated from the source file system to the target file system in the previous replication cycle or in a current replication cycle and the at least one diverged block associated with the first clone object is replicated from the source file system to the target file system in the current replication cycle;

(c) the at least one diverged block associated with the first clone object is replicated from the source file system to the target file system after replicating the read-only snapshot-file object from the source file system to the target file system and creating the second clone object in the target file system;

(d) creating the second clone object sharing associated blocks with the replicated snapshot-file object in the target file system is based on metadata obtained from the source file system;

(e) replicating the at least one diverged block associated with the first clone object from the source file system to the target file system comprises:

(i) detecting at least one block of the first clone object in the source file system which has changed since creation of the first clone object in the source file system based on comparing checkpoint numbers which are associated with blocks of the first clone object in the source file system with a cloned-in-checkpoint number of the first clone object in the source file system;

(ii) transferring, from the source file system to the target file system, blocks having a checkpoint number higher than or equal to the cloned-in-checkpoint number of the first clone object in the source file system; and (iii) updating the first clone object in the target file system based on blocks received from the source file system;

(f) when a third clone object has been replicated in a previous replication cycle to the target file system as regular file system object and has gained the properties of a clone object since the previous replication cycle and the an associated another read-only snapshot-file object has been previously replicated to the target file system, the method further comprises:

(i) transferring metadata for the third clone object and the associated another read-only snapshot-file object from the source file system to the target file system; and (ii) recreating the third clone object in the target file system as a fourth clone object sharing the associated blocks with the associated replicated another snapshot-file object based on the metadata from the source file system and the previously replicated snapshot-file object on the target file system; wherein, when the third clone object has been modified in the source file system and is associated with at least one diverged block other than the blocks shared with the another snapshot-file object in the source file system, the at least one diverged block associated with the third clone object is replicated from the source file system to the target file system;

(g) when a third clone object has been previously replicated to the target file system and has become associated with another read-only snapshot-file object in the source file system since a last replication cycle, the method further comprises replicating at least one diverged block other than the blocks shared with the another read-only snapshot-file object in the source file;

(h) when the source file system includes a regular file system object which was a clone object previously replicated to the target file system and decloned since a previous replication cycle, the method further comprises replicating the regular file system object from the source file system to the target file system including replicating the blocks associated with the regular file system object; or (i) replicating the snapshot-file object from the source file system to the target file system comprises adding a first work item to a clones queue for replication of the read-only snapshot-file object, adding a second work item to a pending map for subsequent replication of the associated first clone object, executing the first work item to replicate the read-only snapshot-file object, and moving, upon completion of such replication of the read-only snapshot-file object, the second work item from the pending map to the clones queue; and wherein replicating the associated first clone object comprises adding an initial work item for the replication of the associated first clone object to a chunk queue, and executing the initial work item including replicating, when the read-only snapshot-file object is an old object, the associated first clone object to the target file system, and terminating, when the read-only snapshot-file object is a new object, execution of the initial work item without replicating the associated first clone object to the target file system.

19. The data storage system of claim 17, further comprising at least one of:
   (a) determining when the first clone object has been replicated in a previous replication cycle to the target file system as regular file system object and has gained the properties of a clone object since the previous replication cycle based on a cloned-in-checkpoint number of the first clone object in the source file system; or
   (b) ensuring that a cloned-in-checkpoint number of the created second clone object in the target file system is higher than checkpoint numbers of the blocks associated with the associated replicated snapshot-file object, wherein the cloned-in-checkpoint number of the created second clone object in the target file system corresponds to a checkpoint number at which the created second clone object was associated with the replicated snapshot-file object.

20. The data storage system according to claim 19, wherein ensuring that the cloned-in-checkpoint number of the created second clone object in the target file system is higher than checkpoint numbers of the blocks of the associated replicated snapshot-file object comprises:
   setting, when a last modified checkpoint number of the associated replicated snapshot-file object in the target file system is different from a current checkpoint number of the target file system, the cloned-in-checkpoint number of the created second clone object to the current checkpoint number of the target file system; and
   issuing, when the last modified checkpoint number of the associated replicated snapshot-file object in the target file system is equal to the current checkpoint number of the target file system, a new checkpoint in the target file system to advance the current checkpoint number of the target file system, and setting the cloned-in-checkpoint number of the created second clone object to the advanced checkpoint number of the target file system.

* * * * *